United States Patent [19]

Ishida et al.

[11] Patent Number: 5,553,262
[45] Date of Patent: Sep. 3, 1996

[54] MEMORY APPARATUS AND METHOD CAPABLE OF SETTING ATTRIBUTE OF INFORMATION TO BE CACHED

[75] Inventors: Itsuko Ishida; Masayuki Hata; Tatsuo Yamada, all of Hyogo-ken, Japan

[73] Assignee: Mitsubishi Denki Kabushiki Kaisha, Tokyo, Japan

[21] Appl. No.: 231,963

[22] Filed: Apr. 22, 1994

Related U.S. Application Data

[63] Continuation of Ser. No. 730,147, Jul. 15, 1991, abandoned, which is a continuation-in-part of Ser. No. 535,240, Jun. 7, 1990, abandoned, which is a continuation of Ser. No. 297,289, Jan. 17, 1989, abandoned.

[30] Foreign Application Priority Data

Jan. 21, 1988 [JP] Japan ................................. 63-11224

[51] Int. Cl.$^6$ ............................. G06F 12/12; G06F 12/08
[52] U.S. Cl. .................... 395/450; 395/455; 395/462; 395/472; 364/DIG. 1; 364/243.11; 364/DIG. 2; 364/964.2
[58] Field of Search .................... 395/425, 400, 395/450, 455, 462, 472

[56] References Cited

U.S. PATENT DOCUMENTS

| | | | |
|---|---|---|---|
| 4,463,420 | 7/1984 | Fletcher | 364/DIG. 1 |
| 4,669,043 | 5/1987 | Kaplinsky | 395/425 |
| 4,719,568 | 1/1988 | Carrubba et al. | 395/425 |
| 4,729,093 | 3/1988 | Mothersole et al. | 364/DIG. 1 |
| 4,853,846 | 8/1989 | Johnson et al. | 364/DIG. 1 |
| 4,905,188 | 2/1990 | Chuang et al. | 364/DIG. 2 |
| 4,924,466 | 5/1990 | Gregor et al. | 371/12 |
| 4,980,823 | 12/1990 | Liu | 364/DIG. 1 |
| 5,136,691 | 8/1992 | Baror | 395/200 |
| 5,265,232 | 11/1993 | Gannon et al. | 395/425 |

FOREIGN PATENT DOCUMENTS

| | | |
|---|---|---|
| 284751 | 10/1988 | European Pat. Off. . |
| 1-187650 | 7/1989 | Japan . |

OTHER PUBLICATIONS

Douglas Clark et al., "The Memory System of a High–Performance Personal Computer", IEEE Transactions on Computers, vol. C–30, No. 10, Oct., 1981, pp. 715–732.

*Primary Examiner*—Eddie P. Chan
*Assistant Examiner*—Reginald G. Bragdon
*Attorney, Agent, or Firm*—Lowe, Price, LeBlanc & Becker

[57] ABSTRACT

A cache memory apparatus allocates memory regions on the basis of information attributes. The required memory region corresponding to the attribute is accessed before caching is implemented. This enables considerable reduction in apparatus that would otherwise be required to be duplicated among different chips corresponding to the number of information attributes. In a multiple data processing implementation, cache memory regions are allocated for each data processor. The required memory regions of the cache memory are accessed in accordance with information specifying the data processor before caching is carried out. To avoid data collision when the main memory data is substantially rewritten, and when data having the same address and different access types exist simultaneously, data representing the type of access is stored. In response to a change in access, all data signals stored in each ways is nullified so that a plurality of data stored in the memory regions is not simultaneously output.

14 Claims, 19 Drawing Sheets

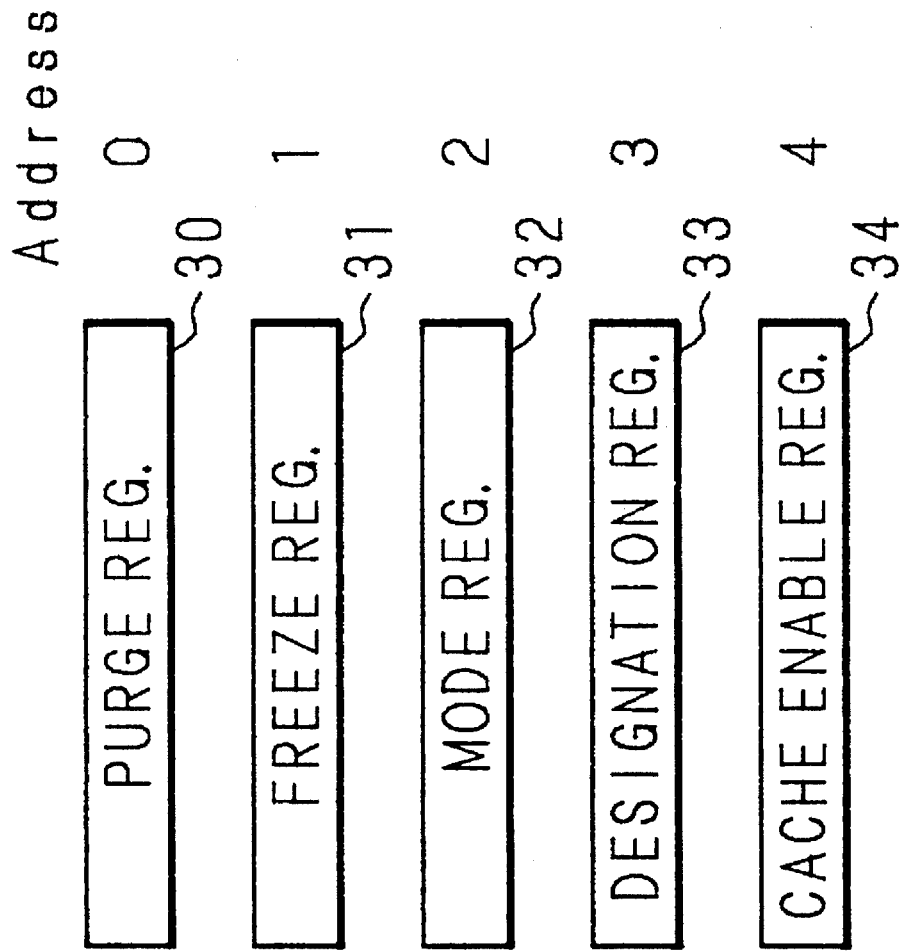
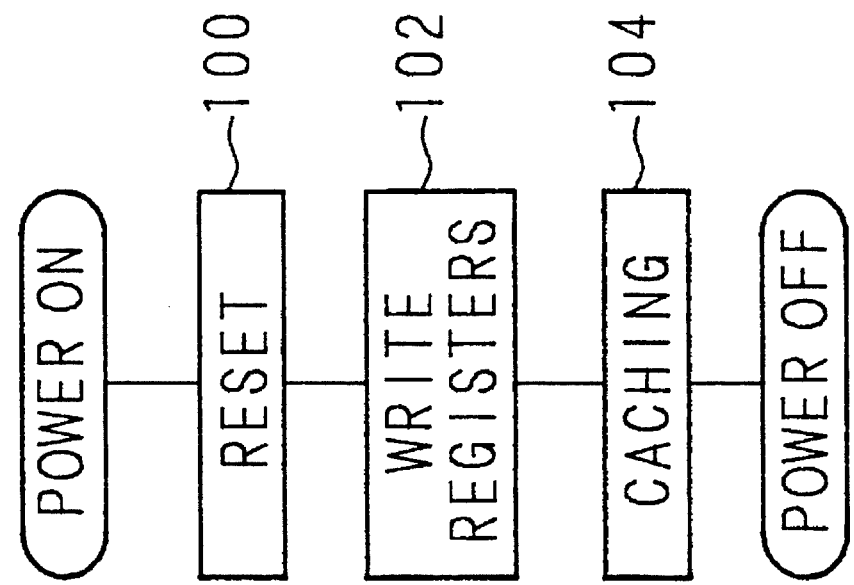

00:INSTRUCTION AND DATA
01:INSTRUCTION
10:DATA
11:RESERVED(NOT USE)

| ACCESS PROPERTY (0)(1) | CONTENT |
|---|---|
| 0 0 | — |
| 0 1 | INSTRUCTION |
| 1 0 | DATA |
| 1 1 | OTHERS |

00:CPU1

01:CPU2

10:CPU3

11:ALL

Fig. 10(c)

| PROCESSOR ID (0) (1) | CONTENT |
|---|---|
| 0  0 | CPU1 |
| 0  1 | CPU2 |
| 1  0 | CPU3 |
| 1  1 | OTHERS |

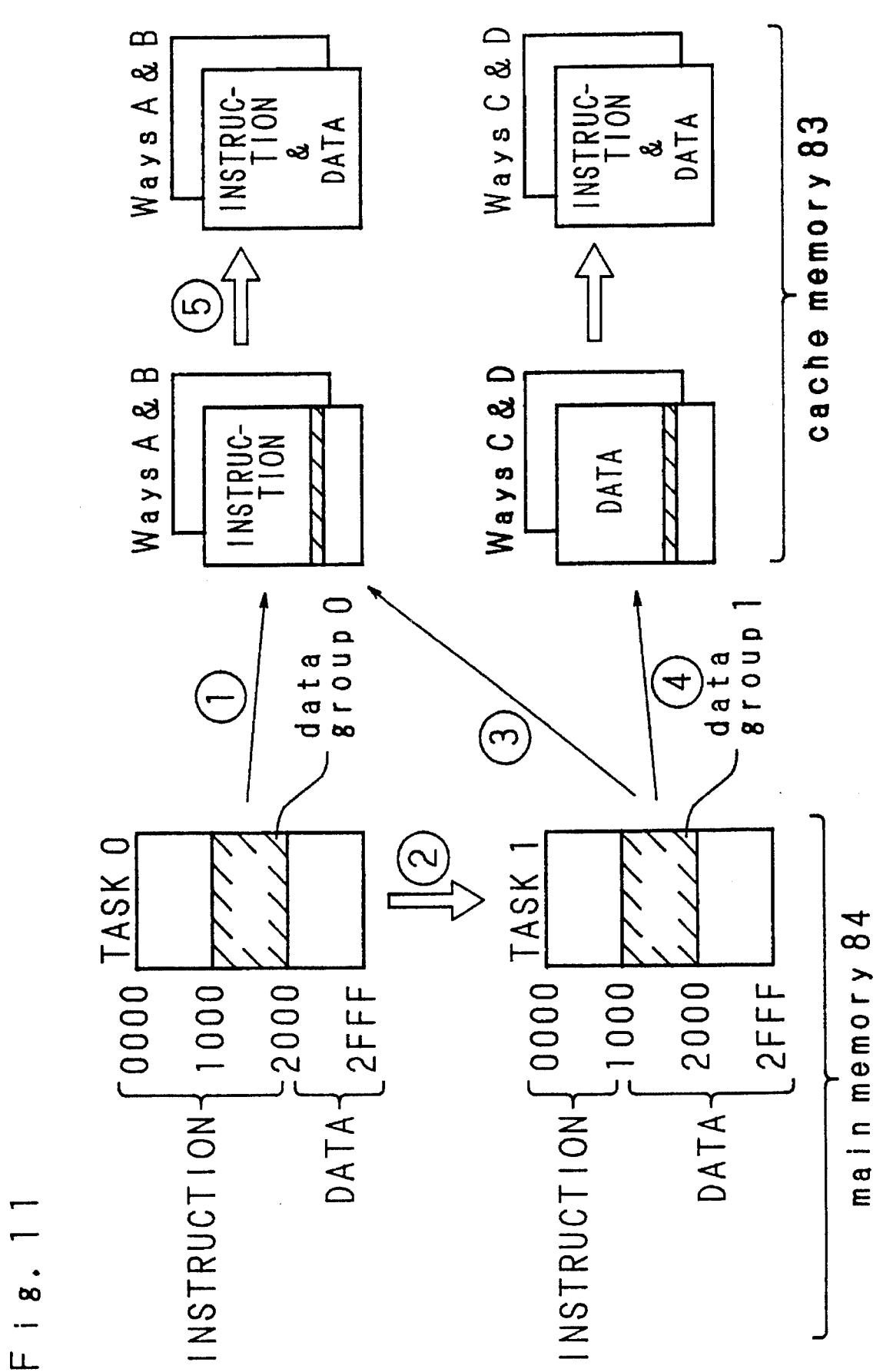

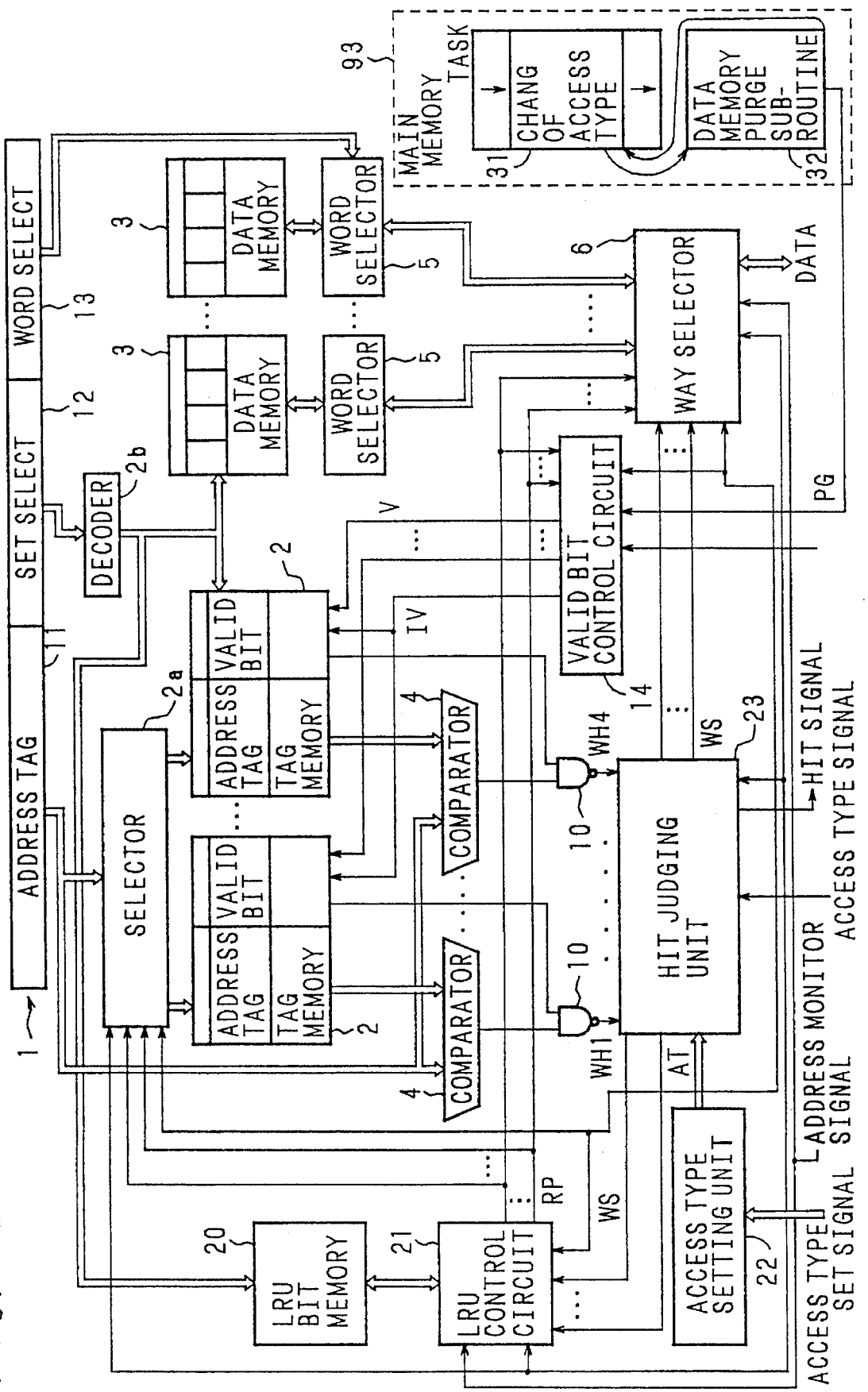

MEMORY APPARATUS AND METHOD CAPABLE OF SETTING ATTRIBUTE OF INFORMATION TO BE CACHED

CROSS-REFERENCE TO RELATED APPLICATIONS

This application is a continuation of application Ser. No. 07/730,147, filed Jul. 15, 1991, now abandoned, which is a continuation-in-pan of application Ser. No. 07/535,240, filed Jun. 7, 1990, now abandoned, which is a continuation of application Ser. No. 07/297,289, filed Jan. 17, 1989, now abandoned.

TECHNICAL FIELD

The present invention relates generally to cache memories, and more particularly to cache memories accessible in accordance with particular access properties. The invention has particular application to a multiple-way cache memory system.

BACKGROUND AND OBJECTS OF THE INVENTION

FIG. 1 is a simplified block diagram of a conventional 4-way set-associative cache memory apparatus. The reference numeral 1 designates address data used for the cache memory apparatus. Address data 1 is composed of address tag 11, entry address 12 and word address 13. Using entry address 12, the cache memory apparatus accesses four-way tag memories 2 and data memories 3. Each "way", is understood to comprise a group of address tags and data sets. A 4-way set-associative cache memory apparatus comprises four ways; four sets of data for one entry, accordingly, can be stored in the cache memory.

Tag memories 2 are provided with corresponding comparators 4, and data memories 3 with corresponding word selectors 5. Each data memory 3 stores information consisting of a plurality of words; each word is provided with a corresponding address.

Word selectors 5 are provided with a way selector 6 which outputs the contents of a selected way to a data processor (not shown in FIG. 1). The content of the way is selected in response to signals supplied by comparators 4 in accordance with the result of a comparison.

In general, an N-way cache memory system utilizes an n-way set-associative method of data mapping. This method divides a memory into N-banks having a plural number of entries. Art entry of the respective banks is determined by the decoded results of plural bits at the middle of an address. The method further compares a tag address stored in the same entry of respective banks with the tag address supplied by a CPU to determine whether there is a "hit" or a "miss". N-way cache memories are known in the prior art. See, for example, "Practical Use of Cache Memory", Computer Design, September, 1988, pp. 116–118.

Operation of the conventional cache memory apparatus is as follows. Still referring to FIG. 1, upon receipt of address data 1 from a data processor in a reading cycle, tag memories 2 and data memories 3 are accessed on the basis of entry address 12. Tag memory 2 of each corresponding way delivers the content of an accessed address to the corresponding comparator 4. Data memory 3 of each corresponding way delivers the content of the accessed address to the corresponding word selector 5. Each word selector 5 in turn selects the content of the word corresponding to word address 13 of address data 1 before delivering the selected data to way selector 6.

Each comparator 4 compares address tag 11 of address data 1 to those address tags delivered from each tag memory 2. If the compared results between these address tags coincide with each other, that is, there is a "cache-hit", comparator 4, via a hit judging unit 13d, outputs a coincidence signal to the way selector 6. On receipt of a coincidence signal, way selector 6 outputs the content of the corresponding word to the data processor.

Conversely, if the compared result between these address tags do not coincide, in other words, during a "cache-miss", the cache memory apparatus accesses the main memory to read certain data from an address of the main memory corresponding to address data 1, and then delivers the read-out data to the data processor. Using a conventional least-recently used (LRU) algorithm, the cache memory apparatus clears the cache memory regions storing the least-usable data to allow storage of the above readout data of the main memory in the cleared memory region.

FIG. 2 is a simplified block diagram of a conventional data processor system (8) with cache memory 83 incorporating separate data-storing and instruction-storing cache memory apparatus. Reference numeral 81 designates a data processor connected to main memory 84 and an optional direct memory access unit 94 through a bus line 82. Instruction-storing cache memory 83a and data-storing cache memory 83b are connected to the middle of bus line 82. Data processor 81 is connected to a chip selecting circuit 86 through access-property signal line 85. Chip selecting circuit 86 in turn is connected to cache memories 83a, 83b through chip-selecting signal lines 87a, 87b.

Operation of the conventional data processor system (8) is as follows. During a data writing cycle in accordance with an access property supplied by data processor 81, chip selecting circuit 86 generates a chip-selecting signal, either the instruction-storing cache memory 83a or data-storing cache memory 83b is selected. Data processor 81 accesses either cache memory 83a or cache memory 83b selected by the chip-selecting signal and selects an instruction or data to be fetched.

As a result, if data should be cached in accordance with an attribute related to instructions or data, a number of cache memory apparatus corresponding to the number of attributes must be provided. This results in a large data processing system. Furthermore, the volume of data stored according to each attribute is variable. This causes data to be stored unevenly resulting in poor utilization of the cache memory apparatus itself.

An object of the invention accordingly is to provide a cache memory apparatus having memory regions corresponding to attributes of information, capable of accessing the required memory regions using information attributes.

Another object is to provide a novel, set-associative cache memory apparatus which arranges information requiring storage in each way of a memory region composed of n-ways in accordance with an attribute of the information so that the needed way can be accessed by the cache memory apparatus using an attribute.

Another object is to provide a novel multiple data processor system which sets memory regions accessible by each of a plurality of data processors, inside a cache memory apparatus, so that the needed memory region can be accessed by information specifying any of the data processors.

Another aspect of the invention is as follows. Referring again to FIG. 2, and assuming that the cache memories 83a, 83b comprise a 4-way set-associative system, the cache memory sets the access type of data stored in every two-ways. "Access type" means a selected one of the following kinds of data, INSTRUCTION, DATA, or co-processor command. When the data processor 81 operates in a reading or writing mode, a signal related to the access type of data of a corresponding address is generated. The cache memory 83 will refer to the access type of data from the data processor (81). During a reading operation of the data processor 81, if a cache-miss occurs, the cache memory stores data in accordance with the access type of data from the data processor (81). On the other hand, when the bus transfer is to an apparatus other than data processor 81, e.g., DMA apparatus 94 on the same bus as the main memory, the cache memory 83 monitors the address in order to maintain coincidence of data with the main memory 84, at which time the cache memory 83, when a cache-miss occurs, carries out no processing. When a cache-hit occurs during the writing operation to the main memory 84, the corresponding data in the cache memory is rewritten. In this case, when an apparatus other than data processor 81 is a bus master, the apparatus may not issue the information related to the access type of data. The cache memory 83 accordingly, rewrites the corresponding data without referring to the access type of data.

Referring now to FIG. 15, which is a flow chart explaining one aspect of data processor in the conventional cache memory apparatus, the access types stored in the ways A and B among four-ways A through D are preset as "INSTRUCTION"; those stored in the ways C and D are preset as "DATA". In the main memory 84, the memory space of task 0 is assumed to be positions 0000 through 2FFF, the access type of positions 0000 through 1FFF is assumed to be "INSTRUCTION", and the access type of positions 2000 through 2FFF is assumed to be "DATA". The data stored at positions 1000 through 1FFF is called data group 0. On the other hand, task 1 is assumed to have a memory space the same as task 0 and the access type of positions 0000 through 0FFF is assumed to be "INSTRUCTION". That of positions 1000 through 2FFF is "DATA". Data stored at positions 1000 through 1FFF is called data group 1. In addition, cache memory 83 is adapted to enable the access type of data stored in every 2-ways to be set.

In FIGS. 2 and 15, initially, the task 0 is assumed to be running. When the data processor 81 reads data in the data group 0 and the cache memory 83 prompt a cache-miss, the cache memory stores 4-word data including the corresponding data in accordance with the access type. In this case, since the access type of data group 0 is "INSTRUCTION", data is stored in the way A or B using path (1). Next, when task 0 is completed and task 1 starts to run, the DMA apparatus 94 changes the task, at which time the DMA apparatus becomes the bus master. The cache memory 83 thereby monitors the address.

The cache memory 83, while address monitoring, rewrites data regardless of the access type, i.e., on the basis of the result of comparing addresses, only when a cache-hit occurs. The data of data group 1 is written in the way storing the data of data group 0 of task 0, in other words, in the way A or B where the access type is "INSTRUCTION", despite the fact that the access type is "DATA", as depicted by path (3) in FIG. 15. Thereafter, when the data processor 81 operates in the reading mode and the cache memory 83 prompts a cache-miss, the aforesaid data is stored in the way C or D where the access type is "DATA", as shown by path (4).

As a result, data of different access types, but having the same address, simultaneously exist in the cache memory 83.

Thereafter, when the access type setting of cache memory 83 is changed to, for example, a "don't care" ("INSTRUCTION" and "DATA" are mixed), as shown by path (5) and the data processor 81 performs a reading operation with respect to data of the data groups 1 and 2, since the access types of data stored in the ways A through D are all the same, all the data are hit so that data in the cache memory 83 collides, shown as path (6). Furthermore, when a multicache system is adopted, collision of data occurs on the data bus.

As depicted in FIG. 15, the conventional cache memory has the problem that, when the data of main memory 84 is largely rewritten and the data having the same address, but different access types, simultaneously exist, and the access type of cache memory is changed and read, collision of data occurs.

A further object of the invention accordingly is to provide a cache memory apparatus wherein a plurality of stored data are not simultaneously output.

A still further object is to provide a cache memory apparatus and method avoiding collision of data when a plurality of data having the same address but different access type are to be simultaneously read.

DISCLOSURE OF THE INVENTION

The above and other objects of the invention are satisfied by a cache memory apparatus that allocates memory regions on the basis of information attributes. The required memory regions corresponding to the attribute is accessed before caching is implemented. This enables considerable reduction in apparatus that would otherwise be required to be duplicated among different chips corresponding to the number of information attributes.

In accordance with another aspect of the invention, in a multiple data processor implementation, cache memory regions are allocated for each data processor. The required memory regions of the cache memory are accessed in accordance with information specifying the data processor before caching is carried out.

In accordance with a further aspect, to avoid data collision when the main memory data is substantially rewritten, and data having the same address and different access types exist simultaneously, data representing the type of access is stored. In response to a change in access, all data signals stored in each way are inhibited.

Still other objects and advantages of the present invention will become readily apparent to those skilled in this art from the following detailed description, wherein only the preferred embodiments of the invention are shown and described, simply by way of illustration, of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4(a) is a simplified flow chart depicting how a caching operation in the invention is carried out.

FIG. 4(b) depicts information registers and addresses thereof, including a designation register constituting a part of the invention.

FIG. 10(b) is a schematic representation of the data format stored in the designation register.

FIG. 10(c) shows CPU identification data associated with the designation register.

FIG. 11 is a data flow chart depicting a potential data flow collision, within a multiple way cache apparatus, to which another/aspect of the invention is directed.

FIG. 12 is a simplified block diagram showing an embodiment of a cache memory apparatus in accordance with a second aspect of the invention.

BEST MODE FOR CARRYING OUT THE INVENTION

Figure 1:
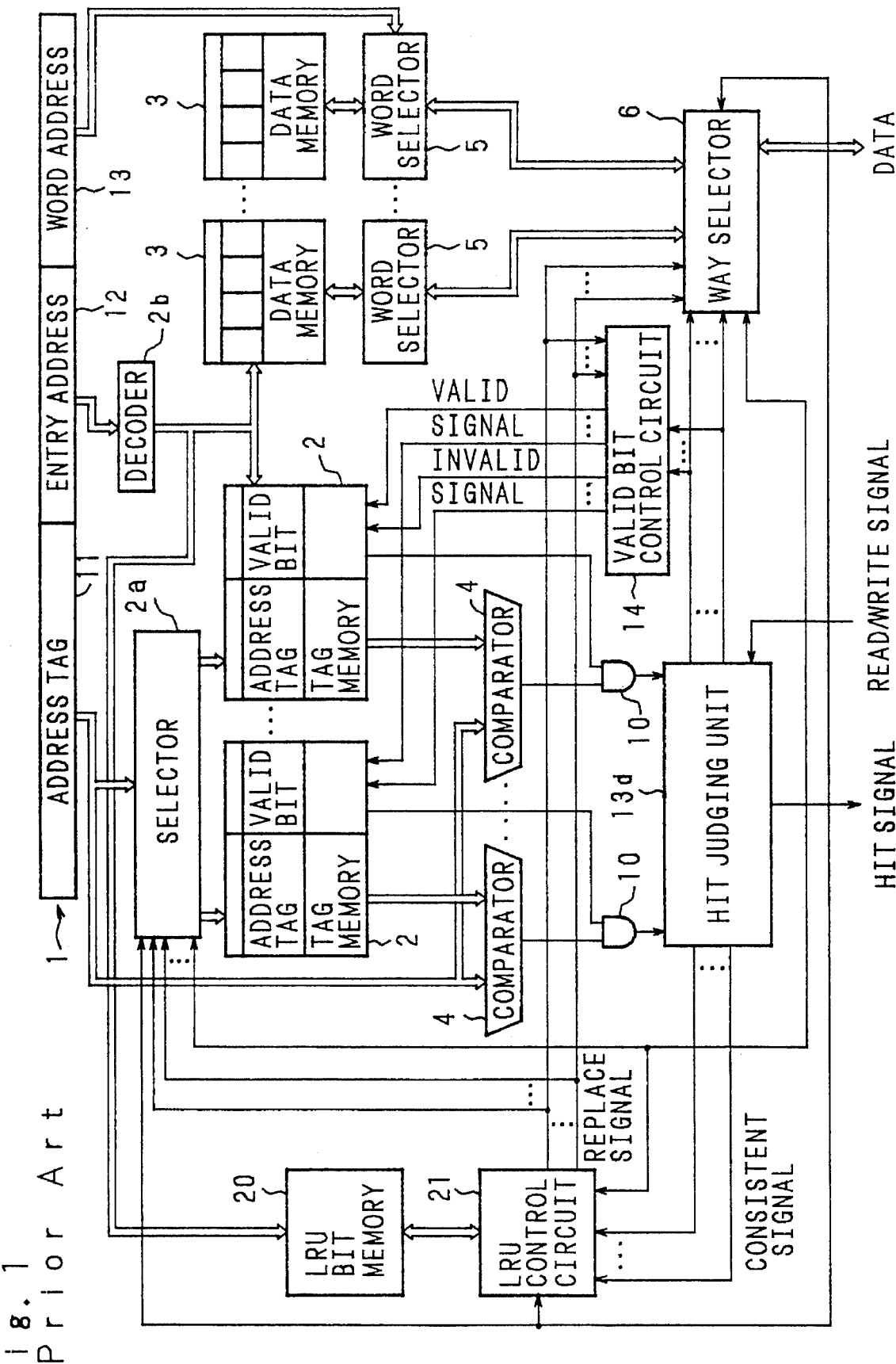
FIG. 1 is a simplified block diagram of a conventional cache memory apparatus.
Figure 2:
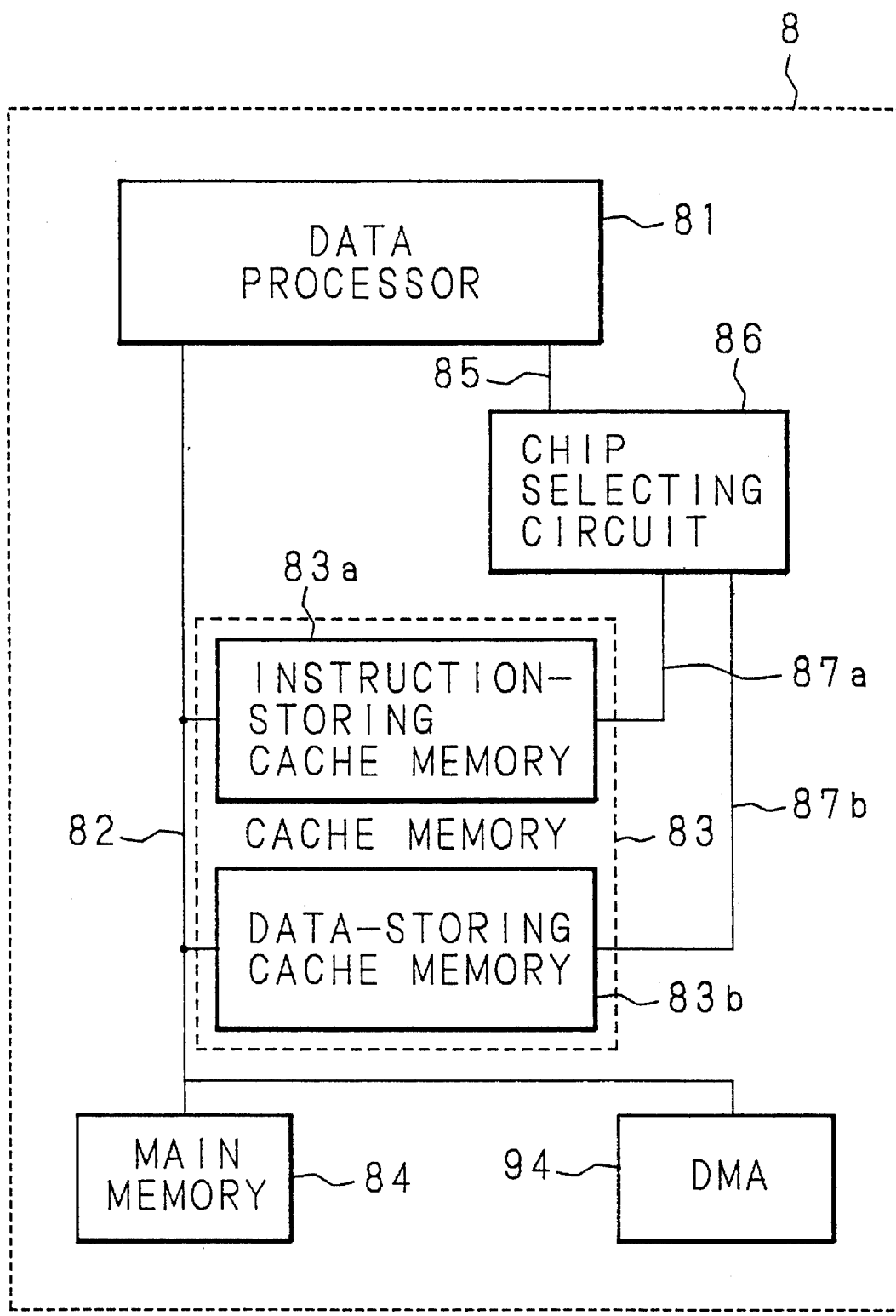
FIG. 2 is a simplified block diagram of a data processor system using a cache memory apparatus of a type shown in FIG. 1.
Figure 3:
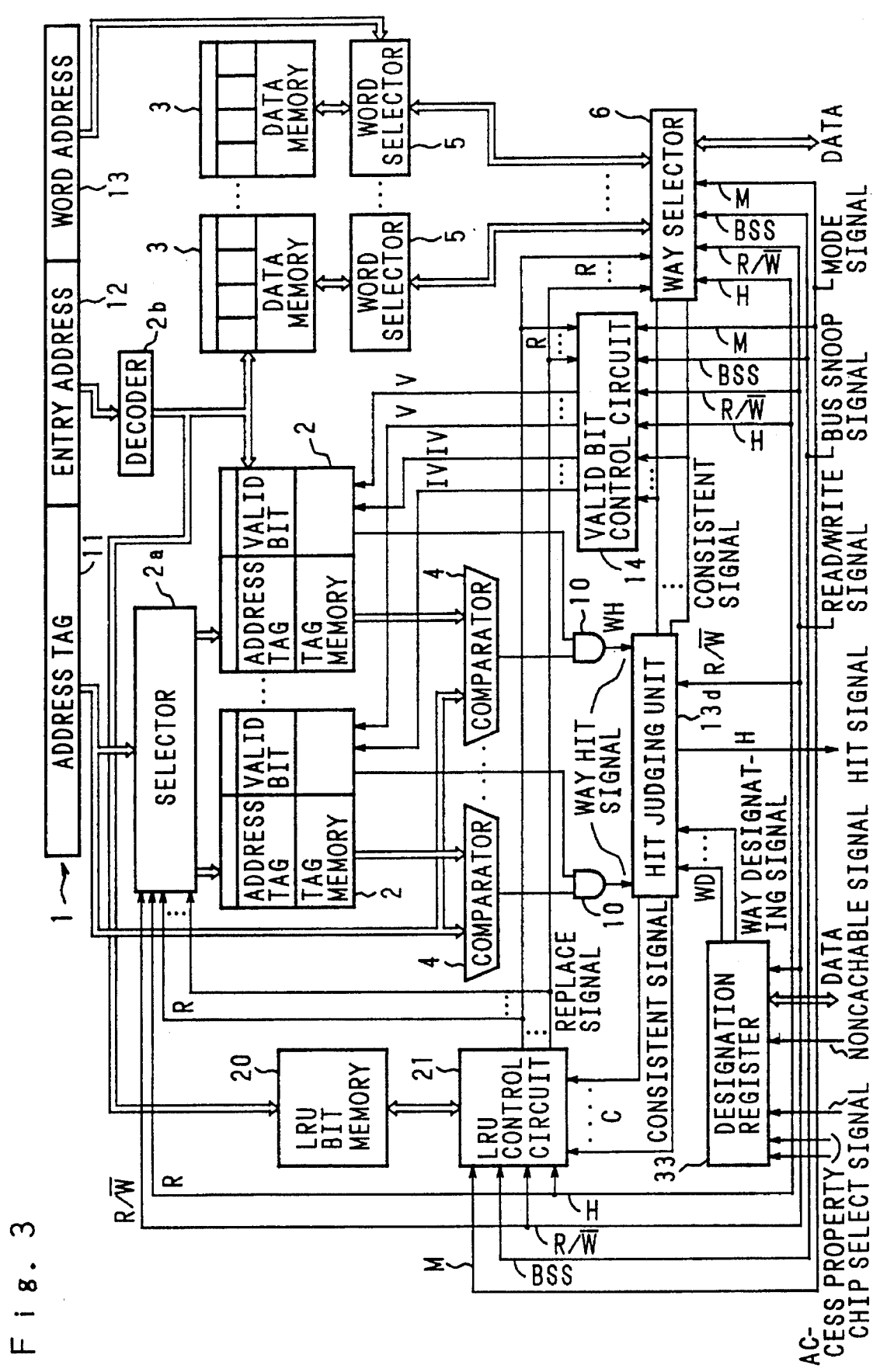
FIG. 3 is a simplified block diagram of one embodiment of a multiple-way cache memory apparatus in accordance with a first aspect of the invention.

Referring to FIG. 3, directed to a first aspect of the invention, the cache memory apparatus corresponds generally to the conventional apparatus shown in FIG. 1. What is added is a designation register (33) that designates either a certain way to be cached or a certain way to which data, read out of main memory during a "cache-miss", should be written. The designation register (33) stores, in advance, which way should correspond to a respective information attribute, by accessing the register of the cache memory apparatus of the present invention immediately after resetting. This presets designation register (33) in a manner similar to conventional registers used in cache memory systems, such as the registers shown in FIG. 4(b).

A simple flow chart showing how caching in the invention is broadly carried out is shown in FIG. 4(a). When the cache memory is energized, it is first reset at step 100 to match the phase of a data processor and clock. Thereafter, in step 102 the data processor writes data into the internal registers of the cache memory to start the cache memory followed by the caching operation (step 104) until power is removed.

Addresses of the internal registers of a cache memory, in addition to the new designation register (33), are shown in FIG. 4(b). The order of the registers is arbitrary, except that the last register in the series must be a cache enable register 34, as shown. The purposes of the conventional registers and designation register (33) will be described later.

When the purge and freeze registers 30, 31 of FIG. 4(b) are not set, the data processor does not write data into them. This is because at the resetting time, both registers 30, 31 have a default value of "not set". Assuming that "1" is written into the mode register 32, when data in a main memory of the same addresses data as a cache memory is rewritten by a bus master other than the data processor during bus snoop, a mode rewriting the data in the cache memory is set.

When writing data into the internal registers of the cache memory, a chip select signal CS and non-cachable signal (NCA) must be made active ("H") and the read/write signal (R/W) is made "L", to inform the cache memory that the internal registers are accessed for writing.

Figure 4C:
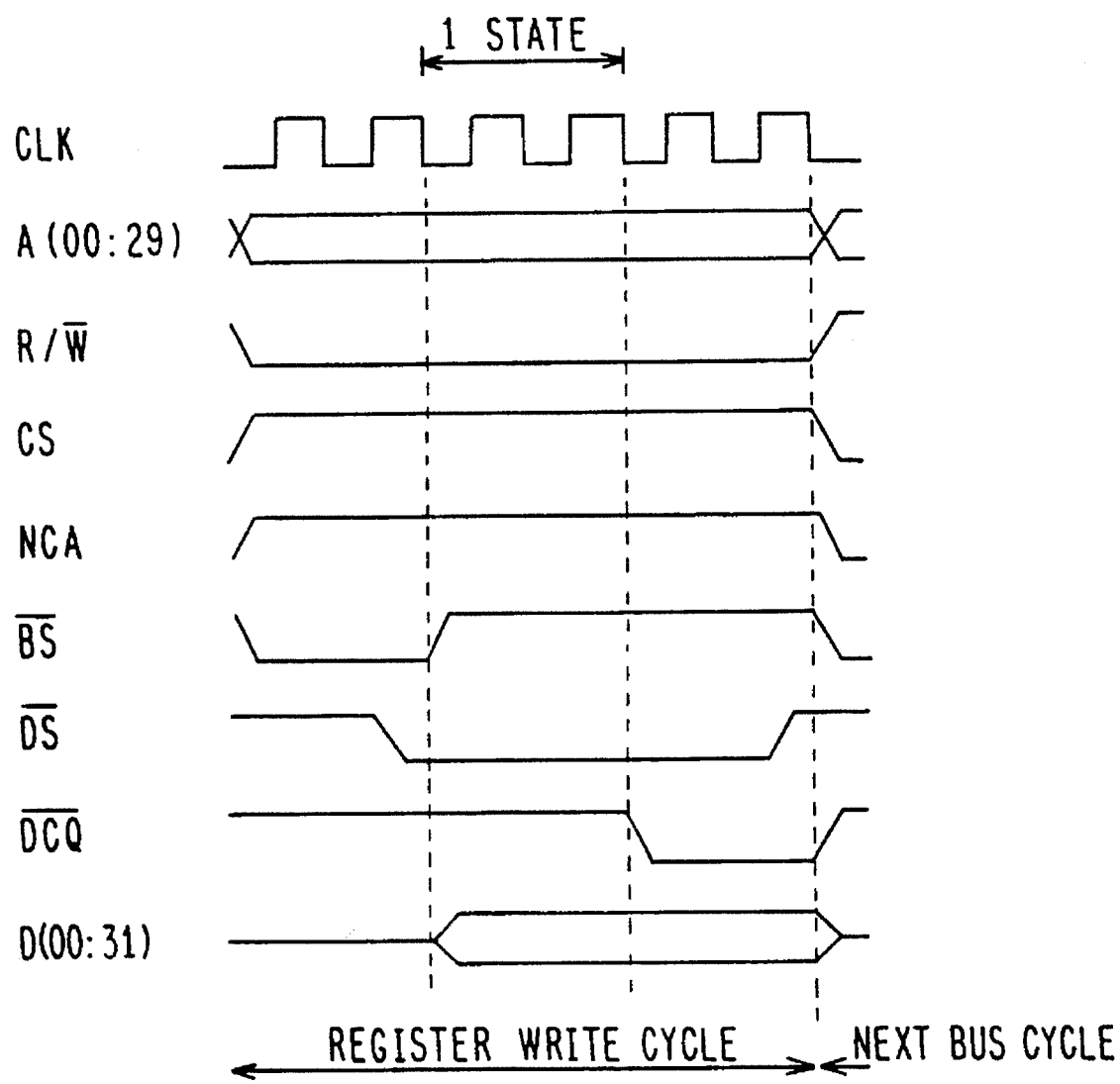
FIG. 4(c) is a register write timing chart for writing to the registers of FIG. 4(b) during an initialization cycle.

Referring to FIG. 4(c) depicting the timing of the internal register write access of the cache memory, at the beginning of the bus cycle the bus cycle start signal $\overline{BS}$ from the data processor is activated to advise of the starting of the bus cycle. Simultaneously, the data processor generates an address indicating the mode register 32, supplies a read/write signal R/W of "L" and a chip select signal CS and a non-cachable signal NCA of "H". A "bar" above the identification of a signal in FIG. 4(c) designates a negative logic signal.

Then, the data processor activates the data strobe signal (DS) to be written into the mode register 32. After the cache memory writes the data, a "data completely out signal"(DCO) is activated to inform the data processor that the data has been received. The data processor completes the bus cycle after receiving the data completely out signal (DCO) from the cache memory.

Assume that the value "01101010" is written in the designation register 33, which indicates that Way A is set to INSTRUCTION and the other way is set to DATA. The signal is outputted the same as writing "1" into the mode register 32, and the address is set to "3" for write access.

Finally, when "1" is written into the cache enable register 34 in the same manner (address is "4"), the cache memory starts caching. Although the purge register 30 and freeze register 31 may be written into during caching, the contents of the mode register 32 and designation register 33 cannot be rewritten into after starting caching. The mode and way setting contents preferably should not be rewritten, because changes midway may cause errors.

When writing into the internal registers (information registers) of the cache memory during caching, the same operations as in the initial case occur wherein the cache enable register 34 is written, the chip select signal (CS) and non-cachable signal (NCA) are made active and the read/write signal (R/W) is made "L" for accessing. When data ("1000" for example) are written into the purge register 30 so as to purge the way A, as the way A is purged during the writing cycle of the purge register 30 (all data stored in the way A become invalid) and contents of the purge register 30 is read in the next bus cycle, the data written cannot be read. Also, assuming that data ("0110") are written into the freeze register 31 so as to freeze the way B and way C, freezing becomes effective the next bus cycle from where the value is written into the freeze register 31. Here, since the freezing is not a main theme, it will not be explained in detail, but when freezing is released, data ("0000") are written into the freeze register 31 again. It goes without saying that when only the way B is to be kept frozen, the data becomes "0100". When the data and instruction which are used frequently are stored beforehand in a specific way and freezing is set on the way (i.e. when storing in the way A), in the case where all of the other ways are frozen (data "0111") and accessed in the standard manner, data are stored only in the way A. After storing the data in the way A, data ("1000") are written again into the freeze register 31 so as to set freezing only on the way A. Since the way is not to be replaced, the data and instruction which are to be used frequently are stored in the cache memory permanently.

The designation register (33) constitutes an important feature of this invention; the purge, freeze and mode registers 30, 31, 32 are well known in the prior art. The purge and freeze registers 30, 31, for example, are implemented in commercially available MC 68020 and MC 68030 cache memory devices, manufactured by Motorola Corporation. The mode register 32 indicates that when its content is "0", data written and hit at the bus snoop is invalidated. When the content of the mode register 32 is "1", data written and hit in the bus snoop state are rewritten.

Figure 5:
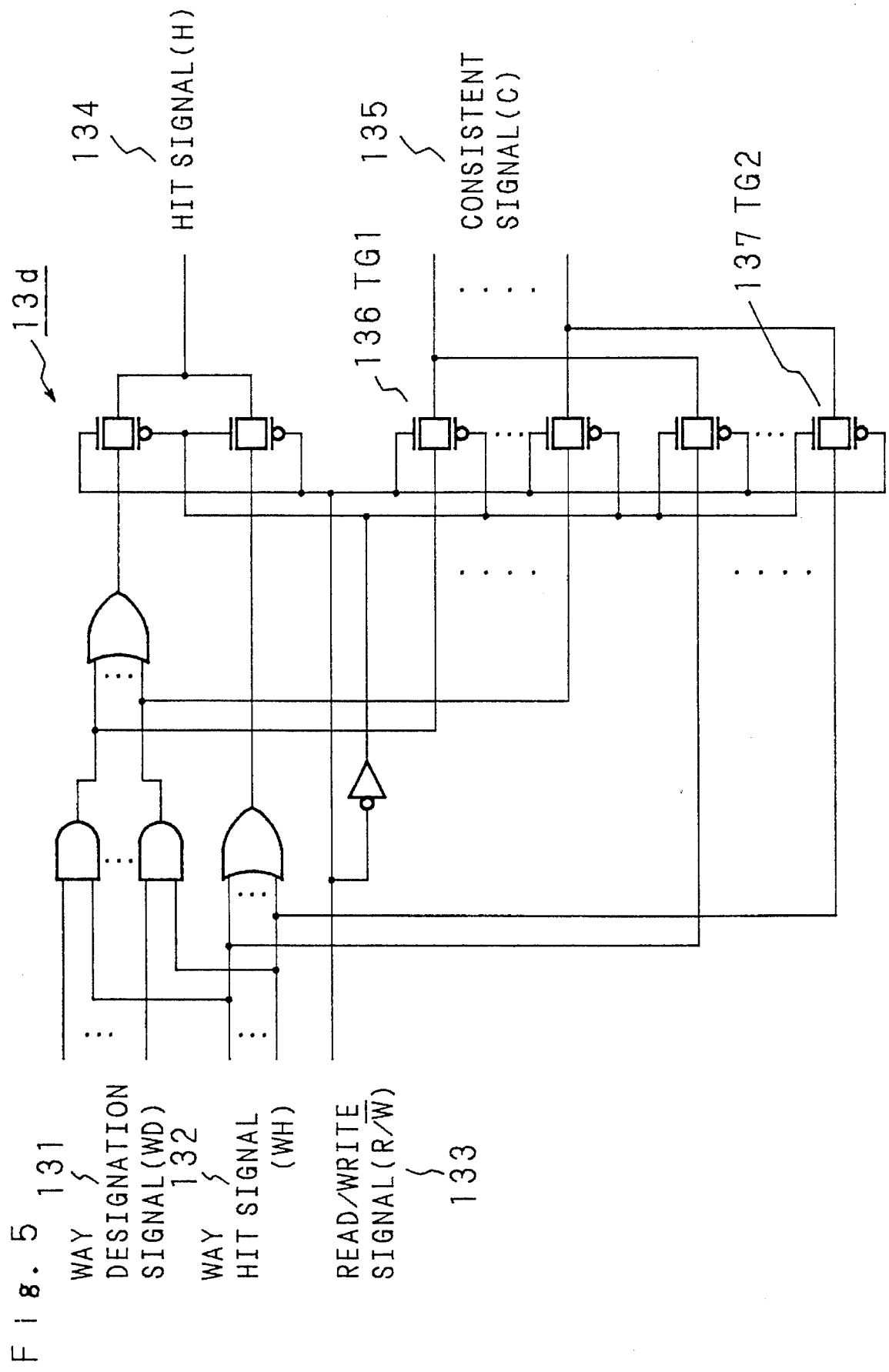
FIG. 5 is a Circuit diagram of a hit judging circuit shown in the diagram of FIG. 3.

FIG. 5 shows a hit judging unit 13d, in which (131) is a way designation signal, (132) is a way hit signal, (133) is a read/write signal, (134) is a hit signal, (135) is a consistent signal, (136) is a transmission gate and (137) is a transmission gate. The way hit signal (132) results from comparing the address tag of a tag memory (3) and the external address (11) tag in a comparator (4) in FIG. 3, and then ANDing with the valid bit in the next AND circuit 10. The way designation signal (131) is the signal outputted from the designation register (33), and shows the compared result between the signal indicating an access property from the data processor and the attribute of the way set already in the designation register 33. The read/write signal (133) indicates the transferring direction of data indicated by the data processor or other bus master. "H" indicates the outputting direction (read) from a main memory, and "L" indicates the inputting direction (write) to the main memory. The hit signal (134) indicates whether the cache memory stores the address data accessed from the data processor. "H" is a so-called hit which indicates that the data is stored in the cache memory (hit), and "L"(miss) indicates that the data is not stored in the cache memory. The consistent signal (135) indicates in which way the cache memory has stored the address data accessed from the data processor. In this cache memory, there are four ways, each having one consistent signal (135). When the consistent signal indicating the way A becomes active ("H"), it indicates that the address data accessed by the data processor is stored in the way A.

Referring next to the configuration, respective ANDs of the way designation signal (131) and the way hit signal (132), where each signal line indicates each way, are ORed, and when the read/write signal (133) is "H", the result is outputted as the hit signal (134). The result of the OR function of the way hit signal (132) is outputted as the hit signal (134) when the read/write signal (133) is "L". Meanwhile, when the read/write signal (133) is "H", the TG1 (136) becomes active and AND of the way designation signal (131) and the way hit signal (132) are outputted as the consistent signals 135 of the respective ways. When the read/write signal (133) is "L", the TG2 (137) becomes active, and the way hit signal (132) is outputted, as it is, as the consistent signals (135) of the respective ways.

The operation of the hit judging unit 13d is explained as follows. In case of the read hit, one of the way hit signal (132) from the AND becomes active ("H") and the read/write signal (133) becomes "H". For instance, assuming that only the way hit signal (132) indicating the hit of the way B becomes active, AND of the way designation signal (131) and the way hit signal (132) from the designation register 33 is obtained to check whether the access properties are consistent. When the access properties of all ways are consistent in this case (all way designation signals (131) are "H"), the way B, together with the previous way hit signal (132), has hit. The OR of the signal incorporating the way designation signal (131) becomes the hit signal (134). Meanwhile, since the read/write signal (133) is "H", the TG1 (136) of the two TG groups (136, 137) becomes active, and outputs the signal incorporating the way designation signal (131) as the consistent signal (135). In this example, only the consistent signal (135) indicating the way B becomes active ("H").

In case of a read miss, all of the way hit signals (132) from the AND become inactive ("L"). Accordingly, all of the ANDs of the way hit signal (132) and the way designation signal (131) become inactive, and the hit signal (134) which is the OR of the ANDs also becomes inactive ("L"). All of the consistent signals (135) outputted from the TG1 (136) also become inactive ("L").

In case of a write hit (same as in the case of a write hit in the bus snoop state), one of the way hit signals (132) from the AND becomes active ("H"), and the read/write signal (133) becomes "L". For instance, only the way hit signal (132) indicating that the way C has hit becomes active. Since the read/write signal (133) is indicating "L", the hit signal (134) is indicated by OR of the way hit signal (132), and in this case, it becomes active. The cache memory in this case writes not only in the access property but anywhere in the writing operation. This is because when the different access properties are accessed for the same address, data of that address is not reliable, a problem solved by another aspect of the invention described later. At reading, even when the access property is different, the cache memory may not output the data, but at writing, in case the cache memory does nothing by the reason that the access property is different, data cannot be kept consistent with the main memory. Meanwhile, since the read/write signal (133) is "L", the TG2 (137) of the two TG groups 136, 137 becomes active, and the way hit signal (132) from the AND is outputted as the consistent signal (135). In this example, only the consistent signal (132) indicating the way C becomes active ("H").

In case of the write miss, all of the way hit signals (132) from the AND become inactive ("L"). Accordingly, the hit signal (134) which is the OR of these signals also becomes inactive ("L"), and all the consistent signals (135) outputted from the TG2 (137) also become inactive ("L").

Figure 6:
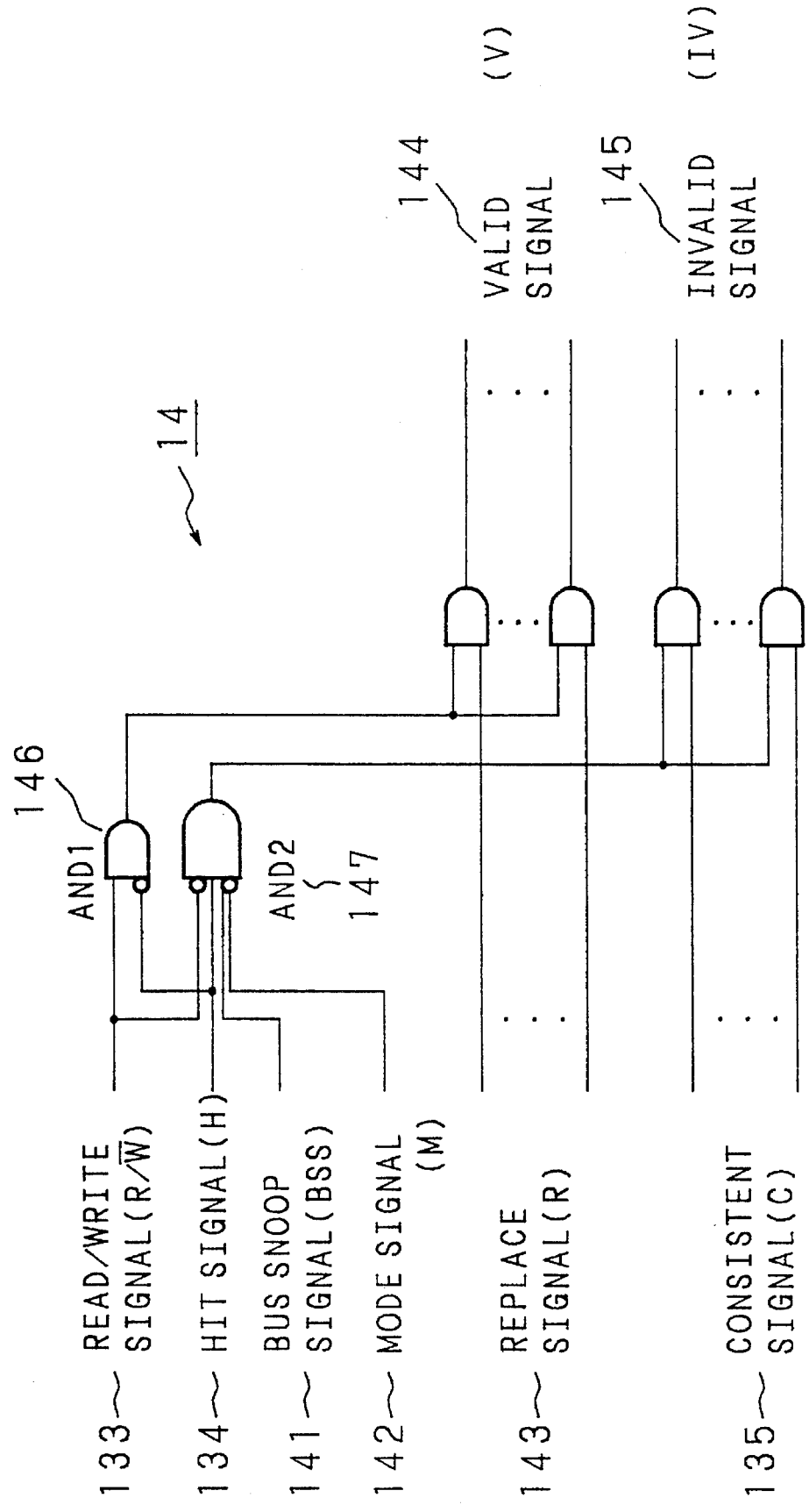
FIG. 6 is a circuit diagram of a valid bit control circuit shown in diagram FIG. 3.

FIG. 6 shows a circuit diagram of a valid bit control circuit 14. In FIG. 6, (133) is the read/write signal, (134) is the hit signal, (141) is a bus snoop signal, (142) is a mode signal, (143) is a replace signal, (136) is the consistent signal, (144) is a valid signal, (145) is an invalid signal, (146) is an AND1 and (147) is an AND2. The bus snoop signal (141) becomes active ("H") when the cache memory is in the bus snoop state. The mode signal (142) is based upon the mode register 32. When the mode signal 142 is "L", it shows that data which has been write hit in the bus snoop state are rewritten. The cache memory performs the bus snoop when the signal (not shown), indicating that the data processor has abandoned the bus right, is activated. The cache memory watches the system bus address and the read/write signal 133 in the bus snoop state, and rewrites to invalidate only the data which has effected write hit. Since the write hit in the bus snoop state means that the external bus master has rewritten data of the main memory which is same as data stored in the cache memory, it is rewritten to be invalid, to make the main memory and the data always consistent.

The replace signal (143) is outputted from an LRU control circuit 21 shown in FIG. 3. The LRU control circuit 21 reads the new and old order of accesses of the 4 ways of the competent entry from an LRU bit memory 20, and makes only the signal indicating the way of the oldest access active ("H"). The consistent signal (136) is outputted from the hit judging unit 13d. The valid signal (144) indicates that the valid bit in the tag memory is made "1". The valid bit is present as one bit in every tag address stored in the cache memory, and indicates that data of the entry is valid when the valid bit is "1". The invalid signal (145) is reverse to the valid signal (144), and indicates that the valid bit in the tag memory 2 is made "0". The tag memory 2 decides the value of the valid bit by combining the decoded result of the entry address (12), the valid signal (144) and the invalid signal (145).

When the read/write signal (133) indicates read ("H"), and the hit signal (134) indicates a miss ("L"), the output of AND1 (146) becomes inactive ("H"), and the hit signal (134) indicates the miss ("L"), the output of AND1 (146) becomes active ("H") and the value of the replace signal (143) from the LRU control circuit is transmitted to the valid signal (144) as it is. Also, when the read/write signal (133) indicates the write ("L"), the hit signal (134) indicates a hit ("H"), the bus snoop signal (141) indicates that data is invalidated at the write hit in the bus snoop state ("L"), the output of AND2 (147) becomes active ("H") and the consistent signal (136) outputted from the hit judging unit 13d is transmitted to the invalid signal (145).

Next, the operation of the valid bit control circuit 14 is described.

In the case of a read hit, either of the consistent signals (136) from the hit judging unit becomes active ("H") as shown in FIG. 5 hereinabove, but since it is not the write hit in the bus snoop state, the AND2 (147) does not become active ("L"), and all of the invalid signals (145) become inactive ("L"). Also, since the AND1 (146) does not become active, all of the valid signals (144) become inactive ("L").

In the case of a read miss, the AND1 (146) becomes active ("H"), and the replace signal (143) from the LRU control circuit 21 is outputted, as it is, as the valid signal (144). Thus, the valid bit of the tag memory 2 of the competent entry of the way being replaced, indicated by the replace signal (143), becomes "1", and replaced data are stored in the cache memory.

In the case of a write hit, either of the consistent signals (136) from the hit judging unit 13d becomes active ("H"), but since the AND2 (147) is not the write hit in the bus snoop state, it does not become active ("L"), and all of the invalid signals (145) become inactive ("L"). Also, since the AND1 (146) is not active ("L"), all of the valid signals (144) become inactive ("L").

In the case of a write miss, since all of the replace signals (143) and the consistent signals (136) are inactive and the AND1 (146) and AND2 (147) do not become active, all of the valid signals (144) and the invalid signals (145) become inactive ("L").

In the case of a write hit in the bus snoop state, either of the consistent signals (136) from the hit judging unit 13d becomes active. When the mode signal (142) is "L", the AND2 (147) becomes active, and the consistent signal (136) is transmitted to the invalid signal (145) as it is. The tag memory 2 of the way where the invalid signal (145) is active makes the valid bit of the competent entry "0" and indicates that the data is invalid.

Figure 7A:
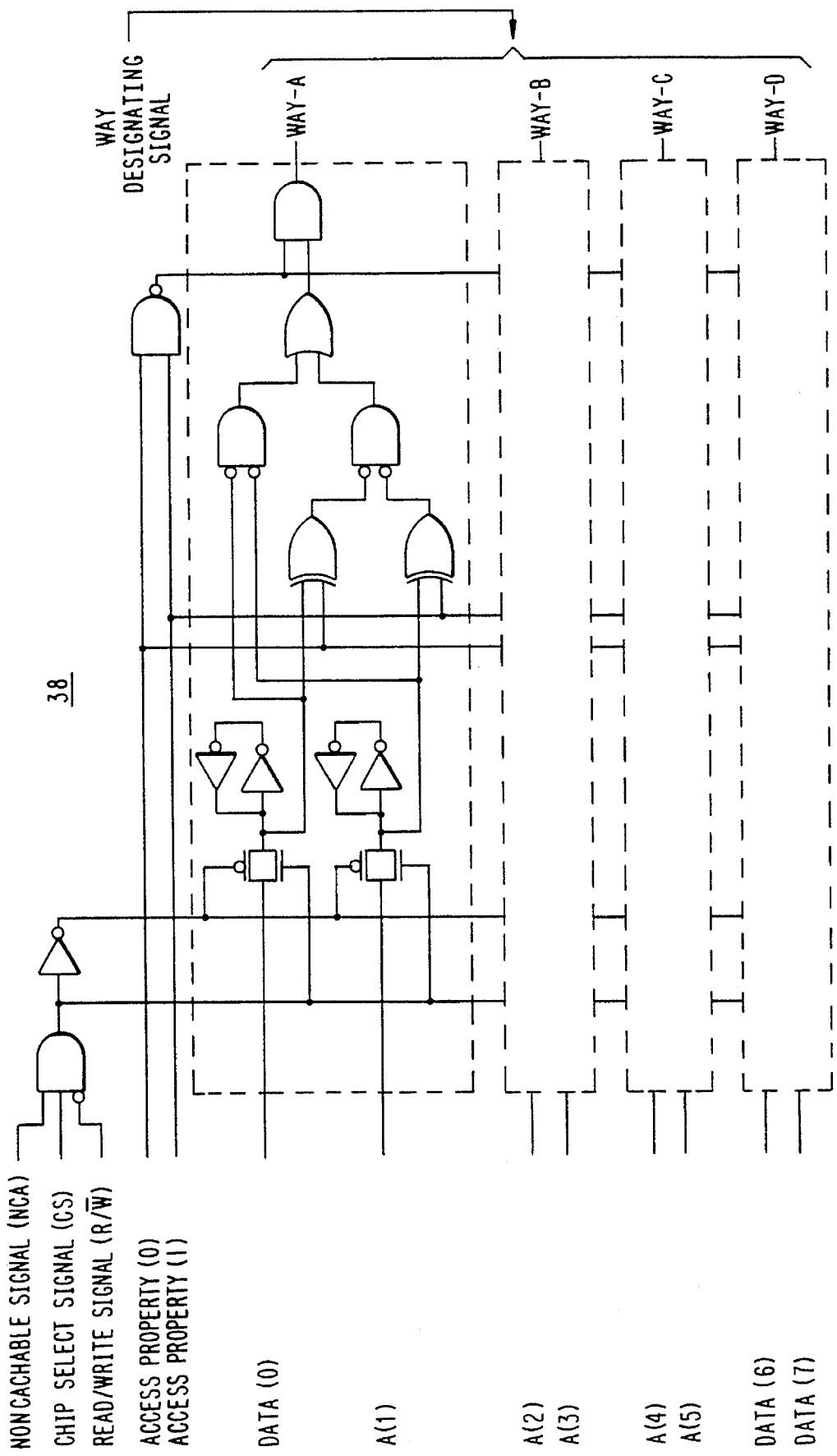
FIG. 7(a) is a circuit diagram of a destination register shown in FIG. 3.
Figures 7B, 7C:
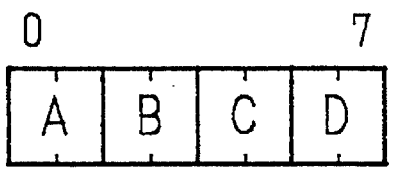
FIG. 7(b) is a schematic representation of the data format stored in the designation register.
FIG. 7(c) shows access properties associated with the designation register.

The operation of the cache memory of the invention will now be explained from the beginning taking into account FIGS. 7(a) to 7(c), showing a detailed circuit diagram of designation register (33), as well as the figures discussed previously.

As shown in FIG. 4(a), a system is built up by switching on a power source. Next, the system is reset to synchronize a data processor, peripheral ICs including a cache memory and a clock.

Then, initialization of the peripheral ICs including the cache memory is performed, but, here, only the cache memory is explained. As shown in FIG. 4(c), the non-cachable signal (NCA) and the chip select signal (CS) are made active to make the read/write signal (R/W) "L". The address signal is incremented sequentially from "0" and appropriate data are written into the internal registers of the cache memory. There are five internal registers in the cache memory as shown in FIG. 4(b), which are, from the address "0", the purge register 30, freeze register 31, mode register 32, designation register 33 and cache enable register 34. The purge register 30 is 4 bits, each of the bits indicating ways A to D, and at "1", all of the data of the competent way become invalid. The freeze register 31 is also 4 bits, each of the bits indicating ways A to D, and at "1", data of the competent way does not become an object to be replaced. The mode register 32 is 1 bit, and at "1", it turns into a mode wherein the competent data is rewritten by the write hit in the bus snoop state. The designation register 33, shown in FIG. 7(b), is 8 bits, which are allocated to the ways A to D by 2 bits each, and the designations of the 2 bit combinations are as shown in FIG. 7(b) when the cache memory starts caching. When writing to the internal registers of the cache memory immediately after resetting, the cache enable register 34 is written to last.

In FIG. 3, when an address inputted from the data processor, irrespective of read/write the entry address (12), is decoded, entries of tag memory (2) and a data memory (3) are selected. In the tag memory (2), an address tag of the selected entry is outputted to comparator (4), and also in the data memory (3) data of the selected entry is outputted to word selector (5). In the comparator (4), the address tag (11) of the address inputted from the data processor and the address tag outputted from the tag memory (2) are compared, and the result of an AND operation of the compared result and the valid bit in the tag memory (2) of the selected entry is outputted to the hit judging unit 13d as the way hit signal (WH). Meanwhile, in the word selector (5), one out of four words is selected and outputted to way selector (6) using a word address (13) of the address inputted from the data processor. The access property (AP), which is the decoded result of the signal indicating the attribute of the access inputted from the data processor, is inputted to the designation register (33), and the accessible way is judged to output the way designation signal (WD).

The structure of designation register (33) is now described with reference to FIGS. 3 and 7. FIG. 7(a) shows a circuit diagram of the designation register 33, FIG. 7(b) shows its format and FIG. 7(c) shows the content of the access property. As shown in FIG. 7(c), there are three types of access property, instruction, data and others. In the designation register 33 (33), the access property is compared with the attribute of respective ways set already (stored in the designation register 33), and in the case of agreement, the way is valid and the way designation signal indicating the way becomes active. In the case of disagreement, the way is invalid and the way designation signal indicating the way becomes inactive. When ("00") is designated, both the instruction and data are accepted. When either the instruction ("01") or the data ("10") of the access property is designated, the way designation signal $\overline{WD}(131)$ of the way becomes active. When the access property designates the other attribute ("11"), all of the way designation signals $\overline{WD}(131)$ become inactive.

Next, the operation of the cache memory is described. In the case of a read access, the read/write signal (R/$\overline{W}$) becomes "H", the way designation signal $\overline{WD}(131)$ is outputted from the designation register (33), and when the way hit signal (WH) 132 is outputted, the way hit is judged in the hit judging unit 13d, and the result is outputted as the consistent signal (c) 135; the hit signal (H) 134 is also outputted.

In the case of a read hit, the consistent signal (C) indicates the way hit, and in the LRU control circuit (21), data of the selected entry of the LRU bit memory (20) is rewritten such that the way hit becomes the latest way. The way selector (6) outputs the word of the way hit among the words for the 4 ways which are outputted from the data memory (3) to the outside of the cache memory. The hit judging unit 13d (3–6) activates the hit signal (H).

In case of a read miss, none of the consistent signals (C) are activated, and the LRU control circuit (3–9) reads data of the selected entry from the LRU bit memory (20) to judge the oldest way, and indicates the oldest way by the replace signal (R). The address tag (11) inputted from the data processor is written in the selected entry of the way, indicated by the replace signal (R) through selector (3–11). The valid bit control circuit (14) makes the valid bit of the selected entry of the way indicated by the replace signal (R) "1", by the valid signal (V). The way selector (6) writes data inputted from the outside in the word indicated by the word address (13) of the selected entry of the way indicated by the replace signal (R). The hit judging unit 13d(3–6) makes the hit signal (H) inactive.

In the case of a write access, the read/write signal (R/$\overline{W}$) becomes "L", the way designation signal (WD) is outputted from the designation register (33), and when the way hit signal (WH) is outputted, the hit judging unit 13d (3–6) judges the hit regardless of the way designation signal (WD), and outputs the consistent signal (C) and the hit signal (H).

In the case of a write hit, the consistent signal (C) indicates the way hit. In the LRU control circuit (21), while designating the way which has write hit as the latest way, data of the selected entry of the LRU bit memory (20) is rewritten. The way selector (6) outputs data inputted from the outside to the word selector (5) of the way indicated by the consistent signal (C), and the word selector (5) writes new data into the word indicated by the word address (13) of the selected entry. The hit signal (H) becomes active.

In the case of a write miss, all the consistent signals (C) and the replace signals (R) become inactive. The cache memory inhibits the operation of the LRU bit memory (20), tag memory (2) and data memory (3).

In the bus snoop state, the operations differ depending on setting of the mode register 32. When "0" is set in the mode register 32 and the write hit is effected in the bus snoop state, the operations differ depending on setting of the mode register 32. When "0" is set in the mode register 32 and the write hit is effected in the bus snoop state, the competent data becomes invalid. The cache memory does not operate in any case other than the write hit in the bus snoop state. If the read/write signal (R/$\overline{W}$) is "L" when the mode signal (M) is inactive and the bus snoop signal (BSS) is active, if either of the way hit signals (WH) becomes active it becomes the write hit in the bus snoop state, and referring to the way designation signal (WD) from the designation register (33), the consistent signal (C) indicates the way hit, and the hit signal (H) becomes active. The valid bit control circuit (14) makes the valid bit of the selected entry of the way indicated by the consistent signal (C) invalid, by activating the invalid signal (IV). The LRU control circuit (21) rewrites data of the selected entry of the LRU bit memory (20) such that the way indicated by the consistent signal (C) becomes the oldest. To effect write hit in the bus snoop state is to rewrite the content of the main memory by the bus master other than the data processor, so that the cache memory has to make the competent data invalid in order to keep the data consistent. Since the data invalidated may be replaced at any time, the competent LRU but memory is rewritten as the oldest data (data to be replaced next) in the LRU control circuit (21).

When "1" is set in the mode register 32, in the case that the write hit is effected in the bus snoop state, data is rewritten. The cache memory does not operate in any case other than the read/write signal (R/$\overline{W}$) is "L" when the mode signal (M) is active in the bus snoop state, and referring to the way designation signal (WD) from the designation register (33), the consistent signal (C) indicates the way hit, and the hit signal (H) becomes active. The way selector (6) outputs data from the outside to the word selector (5) of the way indicated by the consistent signal (C), and the word selector (5) writes data into the word indicated by the word address (13) of the selected entry.

Another embodiment of the invention, wherein the designation register 33 and associated circuitry are applied to a multiprocessor system, is now described. For rapidly processing as much data as possible, a plurality of microprocessors may be used. However, in a main memory shared multiprocessor, since the processors having no local memories and are connected to the shared memory via a bus, there are the following problems: (1) accesses of all the processors are concentrated on the bus creating a bottleneck, and (2) access time increases by passing through the bus. In order to solve these problems, a cache memory is indispensable in these systems.

Figure 8:
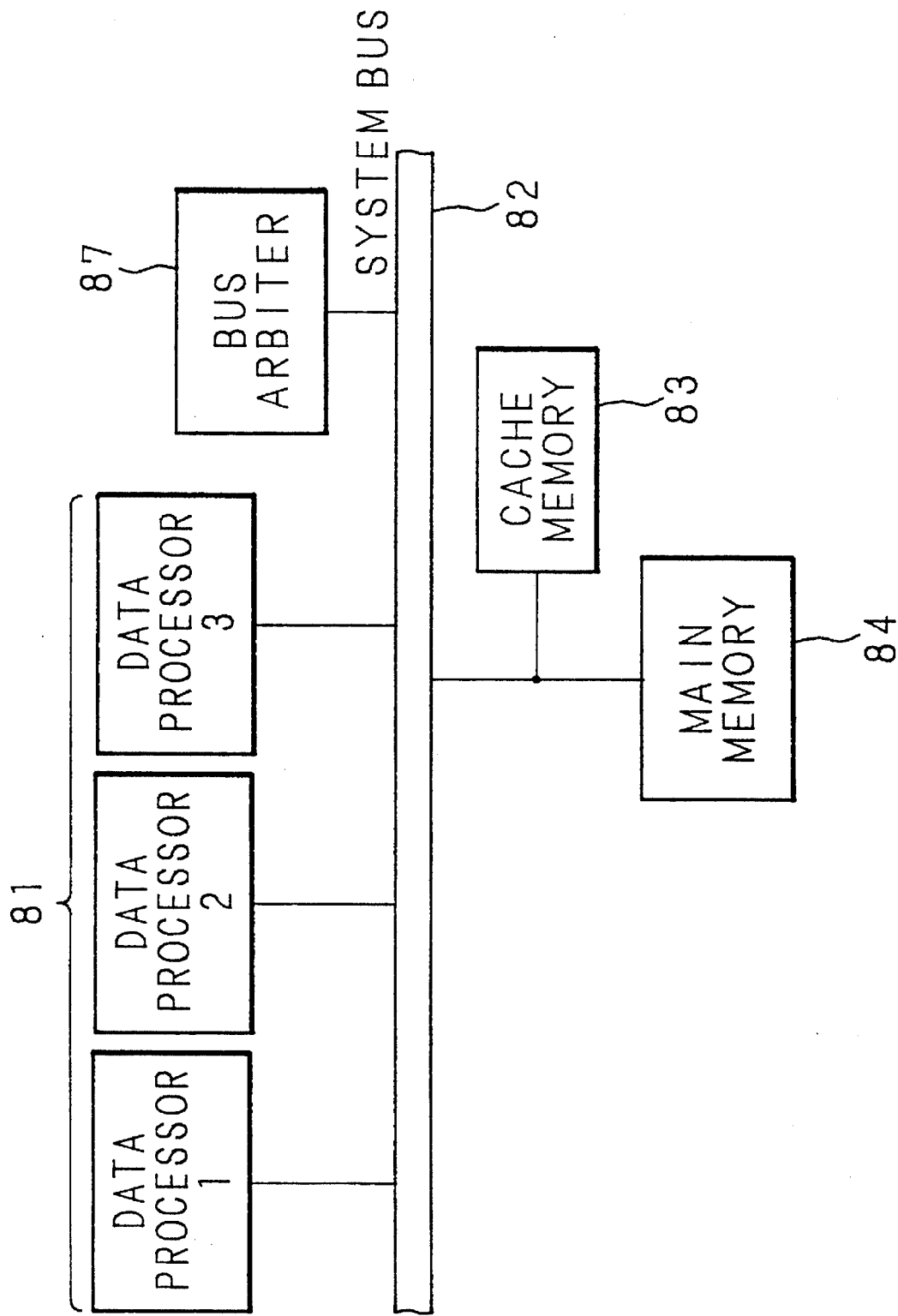
FIG. 8 is a simplified block diagram of a multiple processor system within which the invention may be implemented.

FIG. 8 shows an exemplary configuration of a multiprocessor including a cache memory. Three data processors (81) are connected to the system bus (82). The cache memory (83) is connected in parallel with the main memory (84). Access from the data processors (81) to the system bus (82) is adjusted by a bus arbiter (87), and access of the data processors (81) is always controlled such that data do not collide with each other, as described later.

Figure 9:
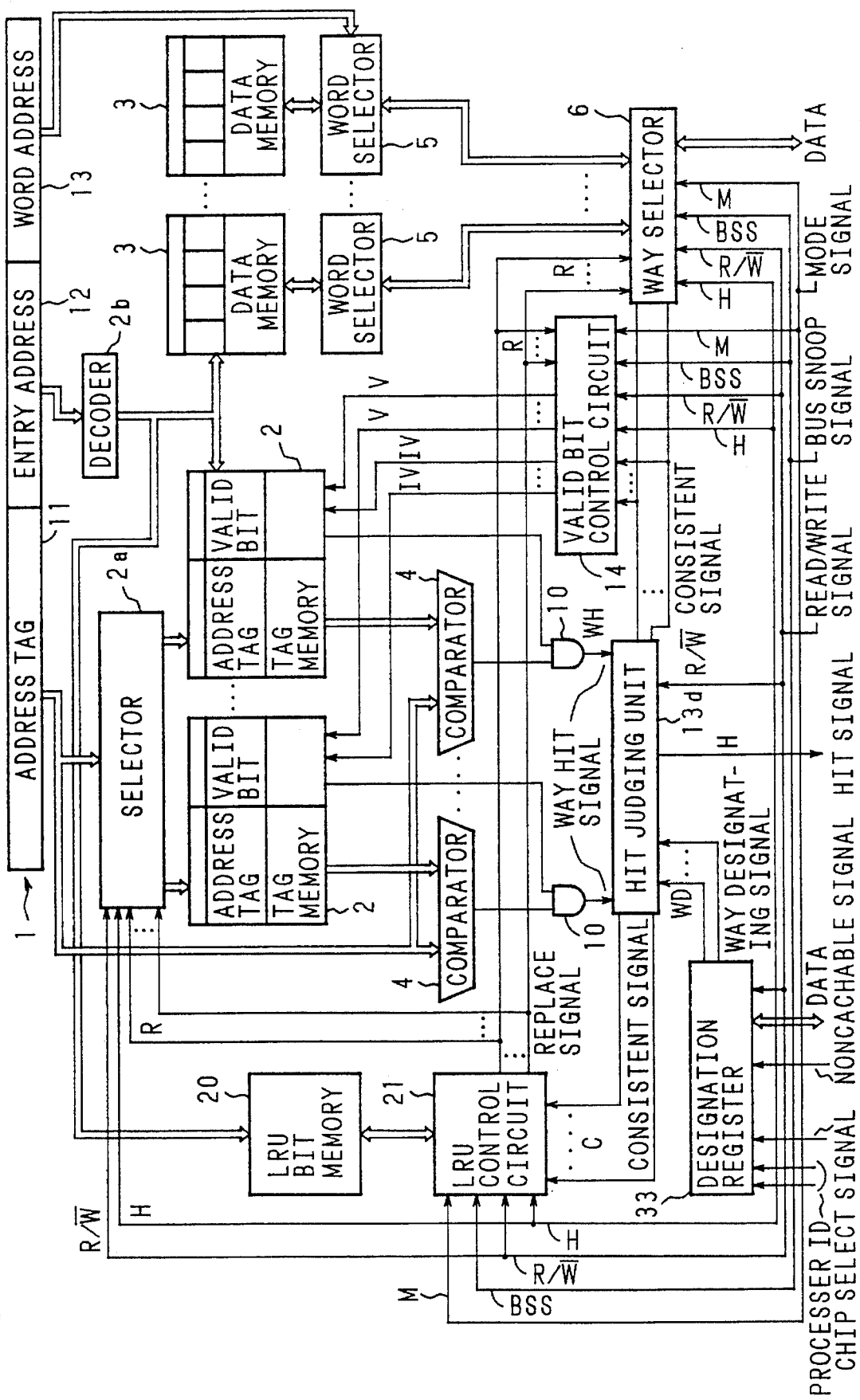
FIG. 9 is a simplified block diagram of a cache memory apparatus for implementation in the multiple processor system of FIG. 8.

FIG. 9 shows an embodiment of the cache memory of the multiprocessor system. The configuration of the cache memory in this multiprocessor system is basically identical to that of the cache memory shown in FIG. 3 except for the following two points, that is, a circuit diagram (shown in FIG. 10) of a designation register (33), and the signal inputted to the designation register (33) is a processor identification, or ID, (PI). Next, the operation of the cache memory of the multiprocessor system is described.

First, a power source is switched on to build up a system. Next, the system is reset to synchronize the data processor and peripheral ICs including the cache memory and a clock. Then, initiation of the peripheral ICs including the cache memory is performed, but, herein, only the cache memory is explained. The non-cachable signal (NCA) and the chip select signal (CS) are made active to make the read/write signal (R/W̄) "L". The address signal is incremented sequentially from "0" and appropriate data are written into the internal registers of the cache memory. There are, as described previously, five internal registers in the cache memory as shown in FIG. 4(b), which are, from the address "0", purge register 30, freeze register 31, mode register 32, designation register 33 and cache enable register 34. As described, the purge register 30 is 4 bits, each of the bits indicating ways A to D, and at "1", all of the data of the competent way become invalid. The freeze register 31 is also 4 bits, each of the bits indicating ways A to D, and at "1", data of the competent way does not become an object to be replaced. The mode register 32 is 1 bit, and at "1", it turns into a mode wherein the competent data is rewritten by the write hit in the bus snoop state. The designation register 33 is 8 bits, which are allocated to the ways A to D by 2 bits each, and the designations of the 2 bit combinations are as shown in FIG. 10(b). The cache enable register 34 is 1 bit, and at "1", the cache memory starts caching. When writing to the internal registers of the cache memory right after the resetting, the cache enable register 34 is written to last.

In FIG. 9, when an address is inputted from the data processor group, irrespective of read/write, the entry address (12) is decoded and entries of a tag memory (2) are selected. In the tag memory (2), an address tag of the selected entry is outputted to a comparator (4), and in the data memory (3), data of the selected entry is outputted to a word selector (5). In the comparator (4), the address tag (11) of the address inputted from the data processor group and the address tag outputted from the tag memory 2 are compared, and the result of an AND operation of the compared result and the valid bit in the tag memory (2) of the selected entry is outputted to a hit judging unit (13d) as the way hit signal (WH). Meanwhile, in the word selector (5), one out of four words is selected and outputted to a way selector (6) using a word address (13) of the address inputted from the data processor. The processor ID (PI), which is the decoded result of the signal indicating the processor ID inputted from the data processor group, is inputted to the designation register (33), and the accessible way is judged to output the way designation signal (WD).

Figure 10A:
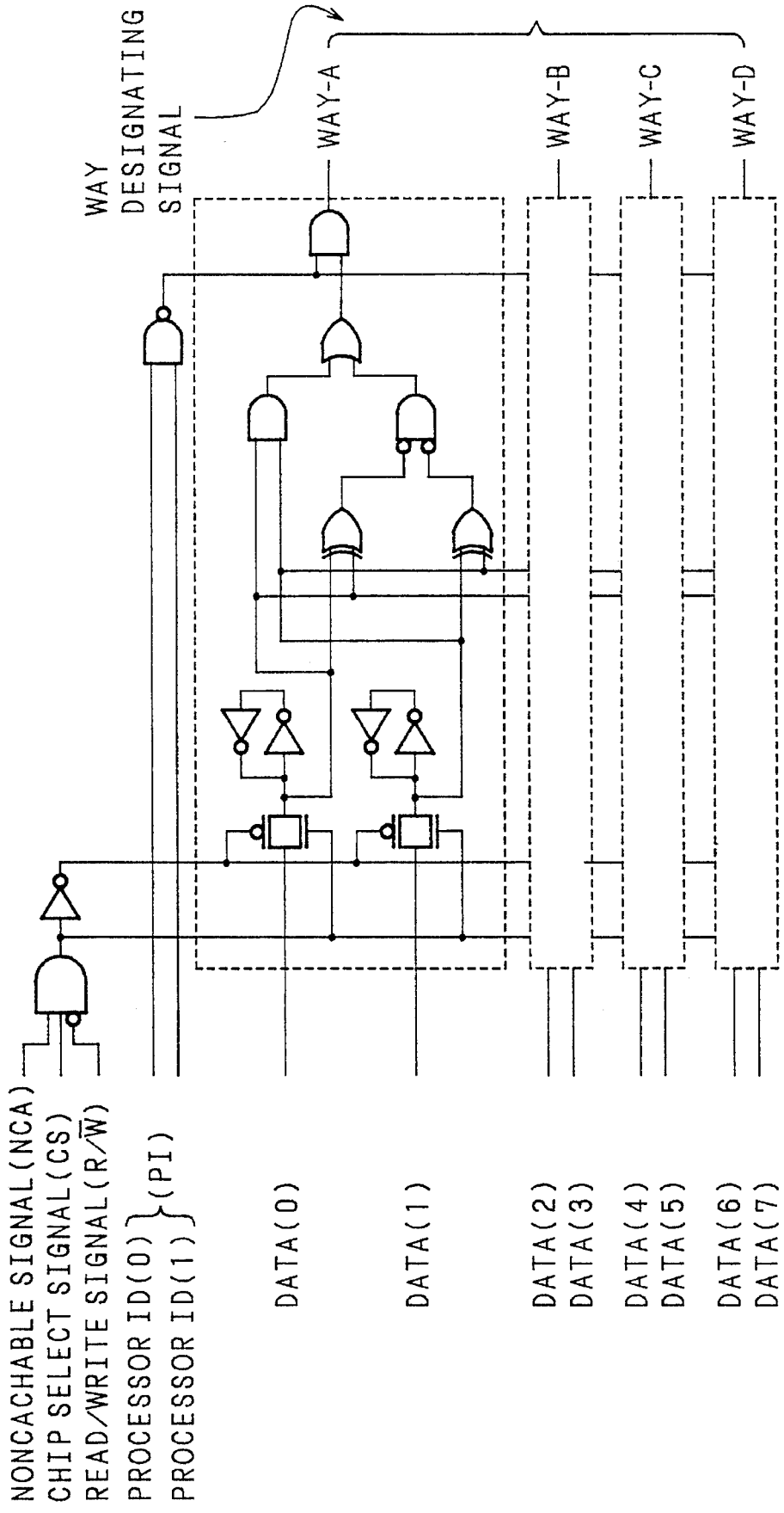
FIG. 10(a) is a circuit diagram of a designation register used in the embodiment of FIG. 9.

Here, the designation register (33) is described with reference to FIGS. 10(a) to 10(cc). FIG. 10(a) depicts format and FIG. 10(c) shows the content of the processor ID. In the designation register (32), the processor ID is compared with the attribute of respective ways set already (stored in the designation register (32)), and in the case of agreement, the way is valid and the way designation signal (W̄D) indicating the way becomes inactive. For instance, at setting, when it is designated ALL ("11") for all of the ways, all of the way designation signals (W̄D) become active even when the processor ID from the data processor group indicates any processors ("00" to "10"). When, for instance, the data processor 1 ("00") is set for the way A and the data processor 2 ("01") is set for the other way, and the processor ID inputted from the data processor group indicates the CPU1 ("00"), the way designation signal (W̄D) which becomes active is only the one indicating the way A. In the same manner, when the processor ID inputted from the data processor group indicates the data processor 2 ("01"), the way designation signal (W̄D) which becomes active is the one indicating the ways B to D. When the processor ID inputted from the data processor group indicates the data processor 3 ("10"), all of the way designation signals (W̄D) become inactive. It goes without saying that all of the way designation signals become inactive when the processor ID, inputted from the data processor group, indicates "11"(or other).

Next, the operation of the cache memory is described with reference to FIG. 9.

In the case of a read access, the read/write signal (R/W̄) becomes "H" and the way designation signal (WD) is outputted from the designation register (33), and when the way hit signal (WH) is outputted, the way hit is judged in the hit judging unit (13d), and the result is outputted as the way designation signal (W̄D); the hit signal (H) is also outputted.

In the case of a read hit, the consistent signal (C) indicates the way hit, and in the LRU control circuit (21) data of the selected entry of the LRU bit memory (20) is rewritten such that the way hit becomes the latest way. The way selector (6) outputs the word of the way hit among the words for the four ways which are outputted from the data memory (3), to the outside of the cache memory. The hit judging unit (13d) activates the hit signal (H).

In the case of a read miss, none of the consistent signals (C) is activated, and the LRU control circuit (21) reads data of the selected entry from the LRU bit memory (20) to judge the oldest way, and indicates the oldest way by the replace signal (R). The address tag (11) of the address inputted from the data processor group is written in the selected entry of the way indicated by the replace signal (R) through selector (22). The valid bit control circuit 14 (14) makes the valid bit of the selected entry of the way indicated by the replace signal (R) "1" by the valid signal (V). The way selector (6) writes data inputted from the outside into the word indicated by the word address (13) of the selected entry of the way indicated by the replace signal (R). The hit judging unit (13d) makes the hit signal (H) invalid.

In the case of write access, the read/write signal (R/W̄) becomes "L", the way designation signal (WD) is outputted from the designation register (33), and when the way hit signal (WH) is outputted, the hit judging unit (13d) judges the hit regardless of the way designation signal (W̄D), and outputs the consistent signal (C) and the hit signal (H).

In the case of a write hit, the consistent signal (C) indicates the way hit. In the LRU control circuit (21), designating the way which has write hit as the latest way, data of the selected entry of the LRU bit memory (20) is rewritten. The way selector (6) outputs data inputted from the outside to the word selector (13) of the way indicated by the consistent signal (C), and the word selector (6) writes a new data into the word indicated by the word address (13) of the selected entry. The hit signal (H) becomes active.

In the case of a write miss, all the consistent signals (C) and the replace signals (R) become inactive. The cache memory inhibits the operation of the LRU bit memory (20), tag memory (2) and data memory (3).

In the bus snoop state, the operations differ depending on setting of the mode register 32. When "0" is set in the mode register 32 and the write hit is effected in the bus snoop state, the competent data becomes invalid. The cache memory does not operate in any case other than the write hit in the bus snoop state. In case the read/write signal (R/W) is "L" when the mode signal (M) is inactive and the bus snoop signal (BSS) is active, if either of the way hit signals (WH) becomes active it becomes the write hit in the bus snoop state, and referring to the way designation signal (WD) from the designation register (33), the consistent signal (C) indicates the way hit, and the hit signal (H) becomes active. The valid bit control circuit (14) makes the valid bit of the selected entry of the way inputted by the consistent signal (C) invalid by activating the invalid signal (IV). The LRU control circuit (21) rewrites data of the selected entry of the LRU bit memory (20) such that the way indicated by the consistent signal (C) becomes the oldest. To effect write hit in the bus snoop state is to rewrite the content of the main memory by the bus master other than the data processor, so that the cache memory has to make the competent data invalid in order to keep the data consistent. Since the data invalidated may be replaced at any time, the competent LRU bit memory (20) is rewritten as the oldest data (data to be replaced next) in the LRU control circuit (21).

When "1" is set in the mode register 32, in the case that the write hit is effected in the bus snoop state, data is rewritten. The cache memory does not operate in any case other than the write hit in the bus snoop state. If the read/write signal (R/W) is "L" when the mode signal (M) is active and the bus snoop signal (BSS) is active, if either of the way hit signals (WH) becomes active, it becomes the write hit in the bus snoop state, and referring to the way designation signal (WD) from the designation register (33), the consistent signal (C) indicates the way hit, and the hit signal (H) becomes active. The way selector (6) outputs data from the outside to the word selector (5) of the way indicated by the consistent signal (C), and the word selector (5) writes data into the word indicated by the word address (13) of the selected entry.

Hereinafter will be described another aspect of the invention, wherein collision of data corresponding to the same address, in different ways is avoided.

Figure 16:
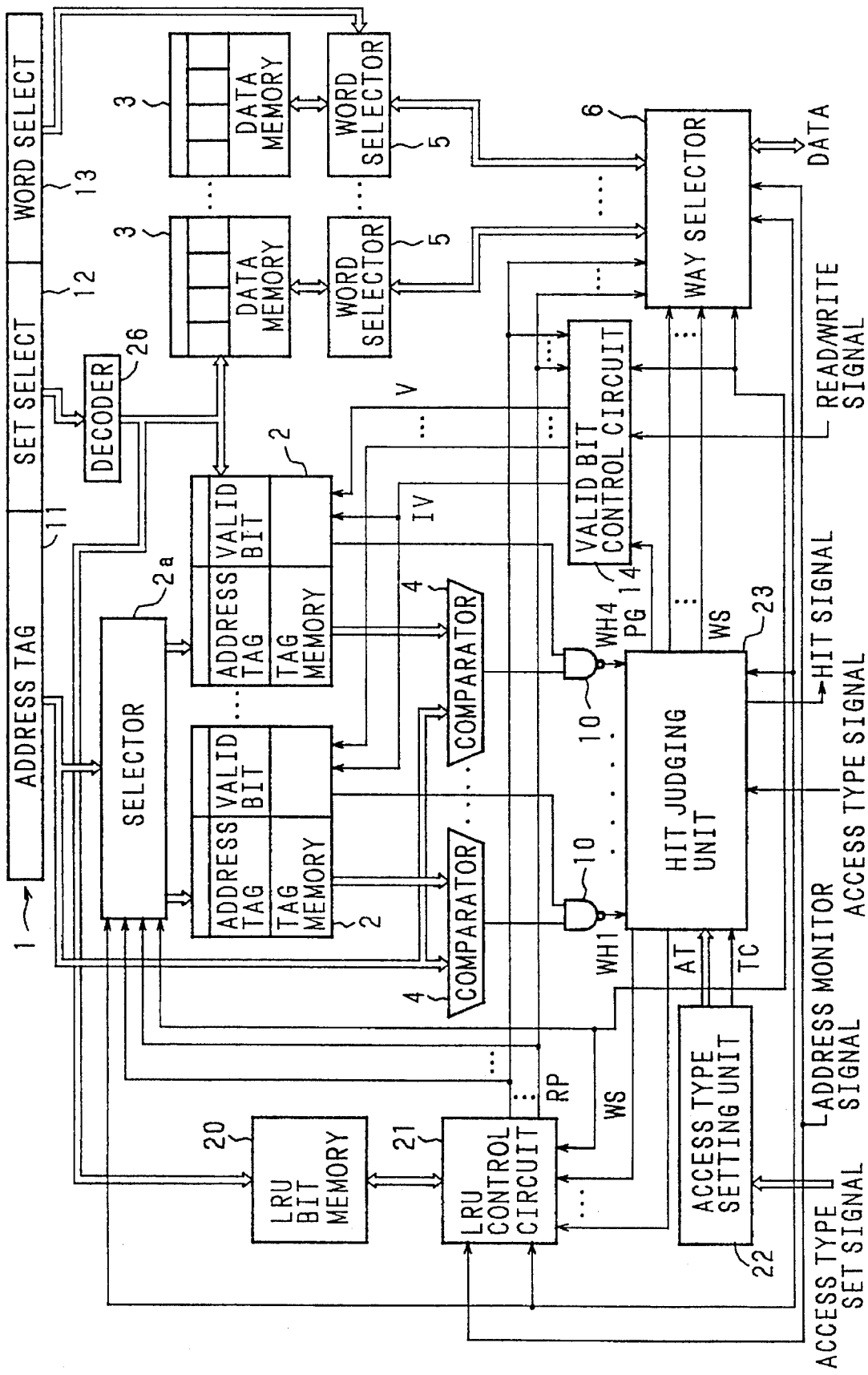
FIG. 16 is a simplified diagram of another embodiment of a cache memory apparatus in accordance with the second aspect of the invention.

Referring to FIG. 16, the embodiment therein is different from the conventional apparatus in that an access type setting unit (22) includes a portion (not shown in this figure) for detecting a change in the access type of the way set by an access type set signal TS. When a change in access type is detected, an access type change signal TC is supplied from the access type setting unit (22) to a hit decision unit (23). The hit decision unit (23) receives the signal TS and supplies a purge signal PG to the valid bit control circuit (14). The valid bit control circuit (14) responds to the signal PG so as to output an invalid signal (IV). The invalid signal (IV) is supplied to the address tag memories (2) regarding all the ways so as to nullify all the valid bits. Therefore, after the setting of access type is change, all the data are nullified.

Figure 15:
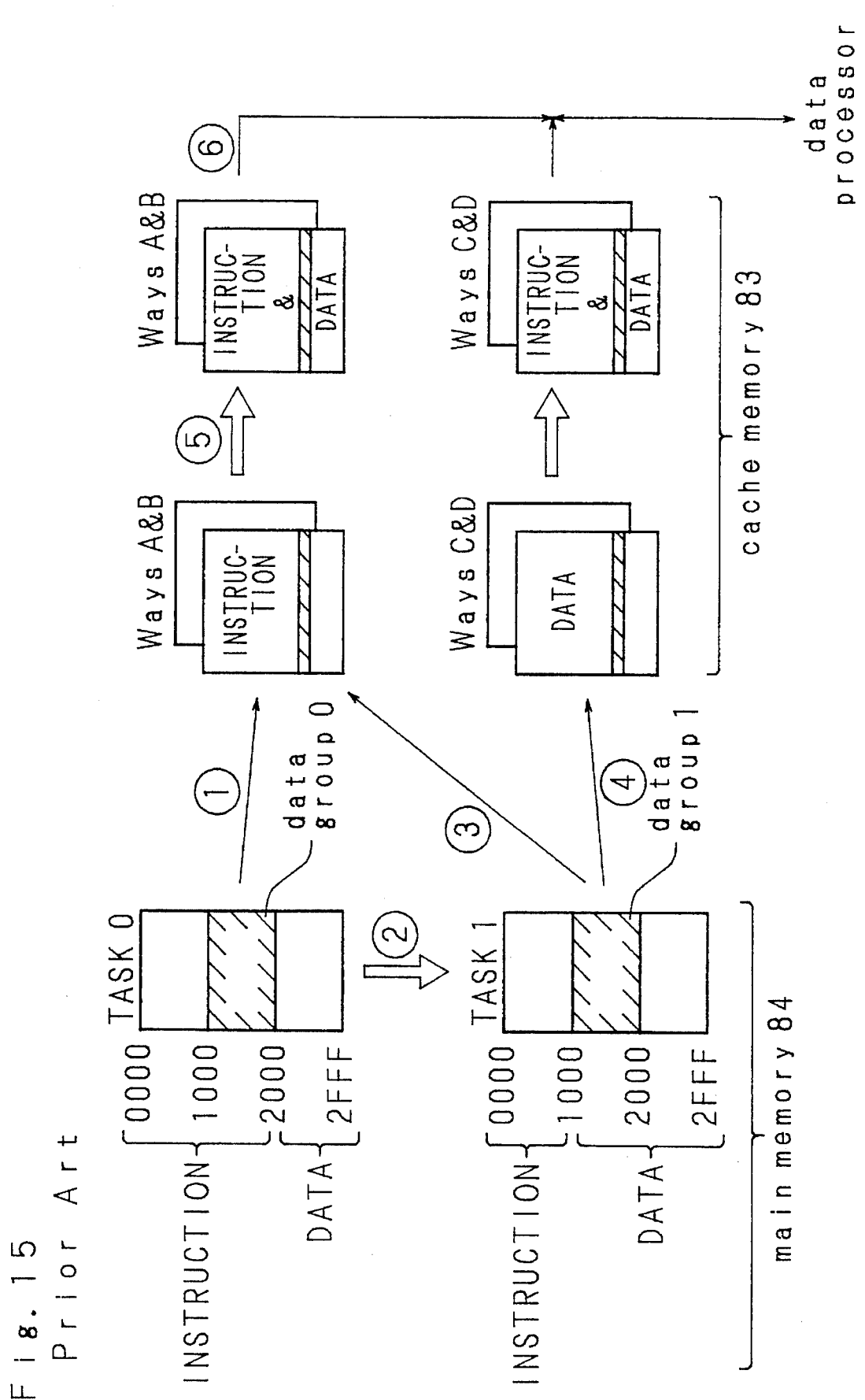
FIG. 15 is a data flow chart explaining operation of a data processor and conventional cache memory system.

FIG. 11 is a data flow chart explanatory of data processor at the cache memory system when the cache memory shown in FIG. 16 is used. Referring to FIG. 11, the data flow chart thereof is different from the conventional data flow chart shown in FIG. 15 in the following point. As mentioned above, in the way A or B whose access type is "INSTRUCTION", there is written data of data group 1 whose access type is "DATA", via path (3). Thereafter data processor 91 reads the data and writes it in the way C or D whose access type is "DATA". However, when the setting of access type of cache memory 83 thereafter is changed to, for example, "don't care"("INSTRUCTION" and "DATA" are mixed), an access type change signal TC is outputted from the access type setting unit (14), shown in FIG. 16, so that the invalid signal IV output from the valid bit control circuit 14 (14) nullifies all the data of the way A or B as shown in path (5). As a result, even when data processor 91 thereafter performs a read operation, there is no possibility that the cache memory 83 will effect a cache miss creating a collision of data on the data bus 82.

Logical circuit diagrams exemplary of circuits that may be implemented to provide hit judging unit 13d and valid bit control circuit 14 are shown in FIGS. 5 and 6, discussed earlier.

FIG. 12 is a block diagram of another embodiment of the cache memory of the invention. Referring to FIG. 12, the cache memory thereof is different from the cache memory shown in FIG. 16 in that a purge signal (PG) is outputted from the processor 91 by a data memory purge subroutine within a main memory 84. A valid bit control circuit 14, the same as in FIG. 16, responds to the signal (PG) to output the invalid signal (IV). At the address tag memories (5) for all the ways, all the valid bits of the data are nullified in response to the signal (IV).

The processing of outputting the purge signal (PG) from the main memory (84) is exemplary as follows. A certain task is assumed to travel in the main memory (84). When a change in access type is instructed in this task, a data memory purge subroutine starts, the signal (PG) being outputted from the processor of subroutine.

When the cache memory shown in FIG. 12 is used, processing of the data is the same as the data flow in FIG. 11 and the same effect can be obtained.

Figure 13:
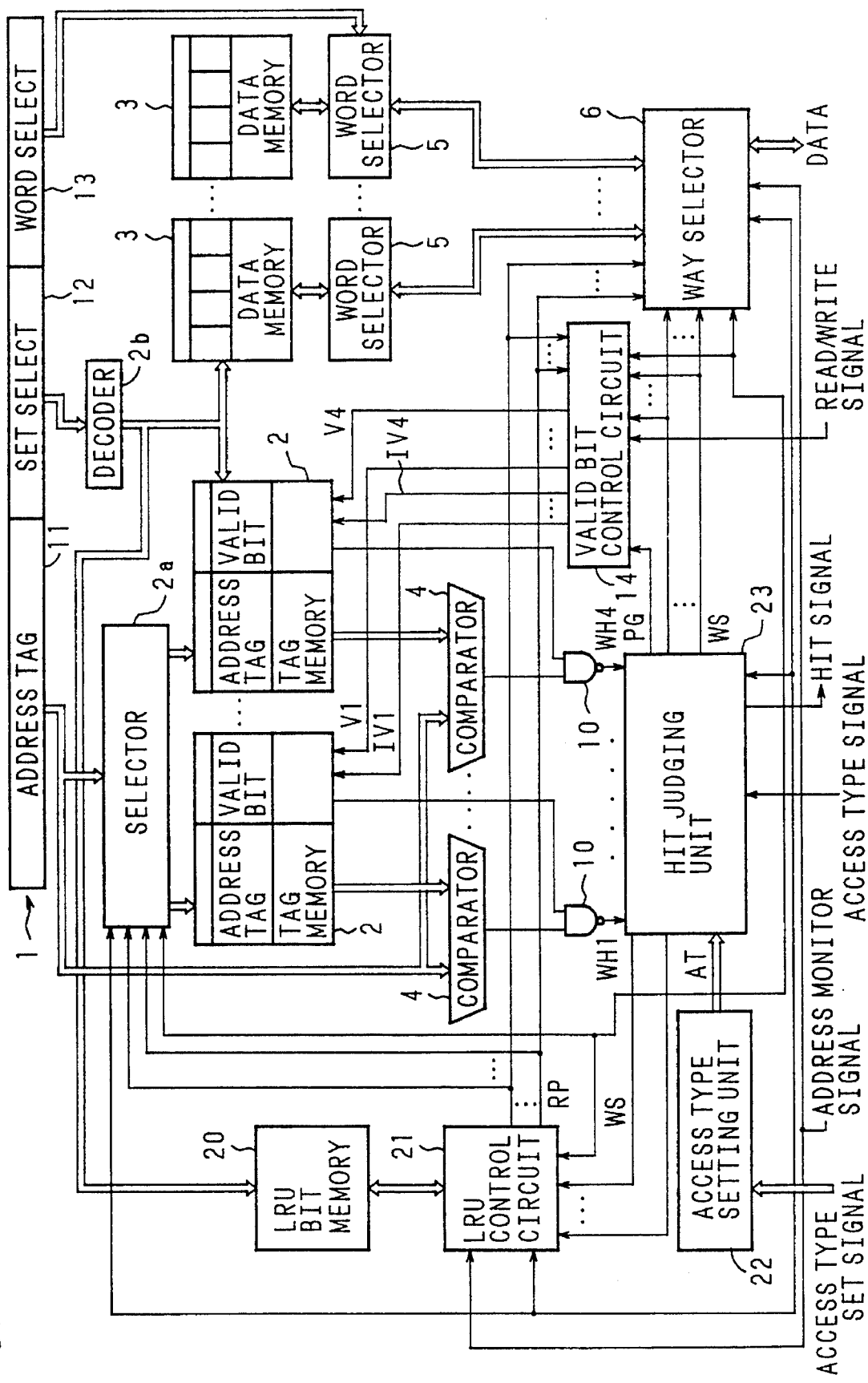
FIG. 13 is a simplified block diagram of another embodiment in accordance with the second aspect of the invention.

FIG. 13 is a block diagram of another modified embodiment of a cache memory of the invention. Referring to FIG. 13, the cache memory is different from that shown in FIG. 16 in that a hit decision unit (23) detects which way is hit by way hit signals (WH1 through WH4) supplied by a logical circuit (10) and compares the already set access type of the hit way with an access type signal AT, so that, when coincidence thereof is not obtained, a purge signal (PG) is outputted. A way select signal showing the hit way is supplied also to a valid bit control circuit (14), which nullifies the valid bit of address tag memory 2 in the hit way. The nullification is carried out at every way by the invalid signals (IV1 through IV4).

Figure 14:
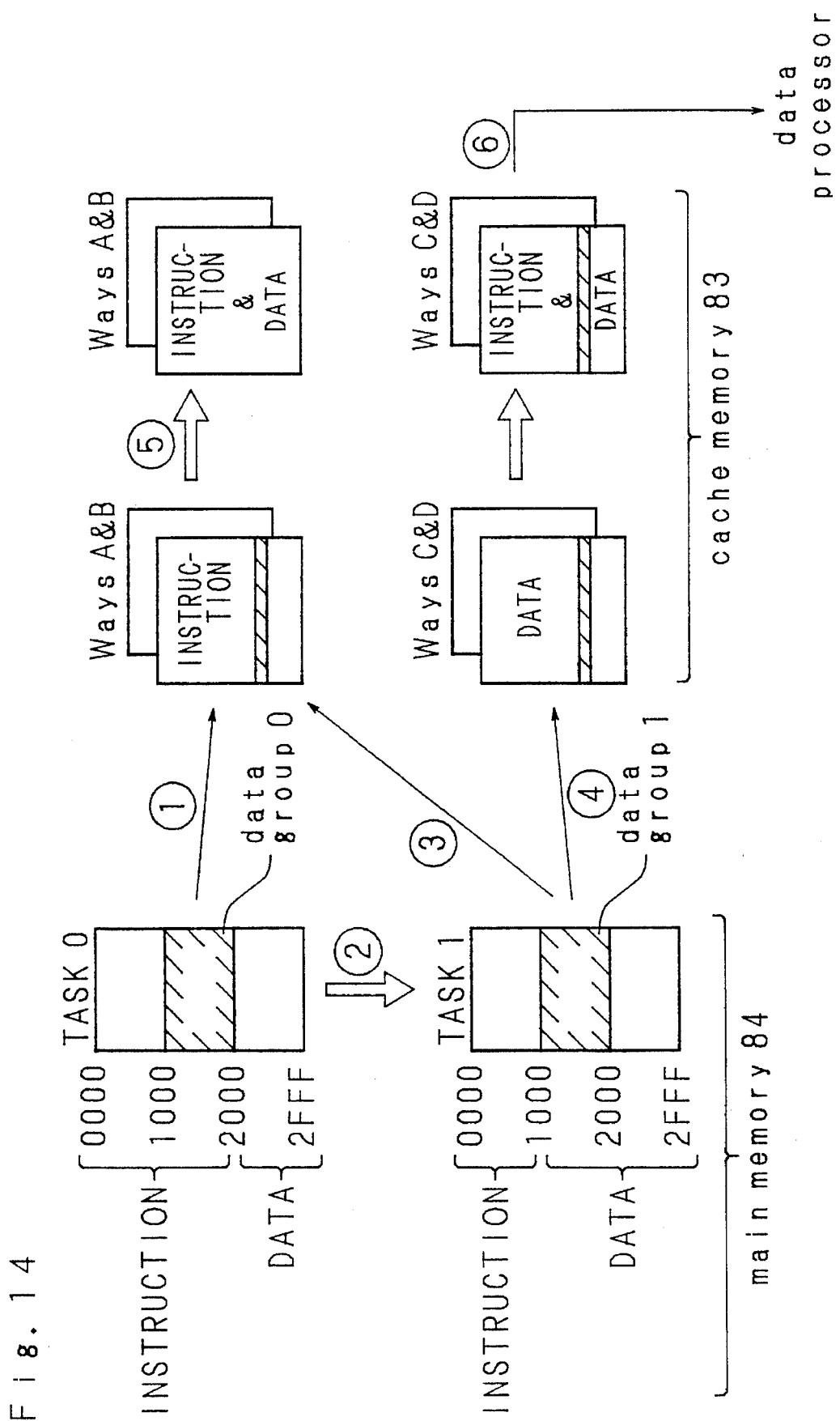
FIG. 14 is a data flow chart explaining data processor when the cache memory of FIG. 13 is implemented.

FIG. 14 is a data flow chart explanatory of data processor at the cache memory system when the cache memory shown in FIG. 13 is used. Referring to FIG. 14, the data flow is different from that shown in FIG. 11 in that after the processing of paths (1) through (3), data coincident in address are stored simultaneously with the processing at path (4) and the data at the ways A and B of different set access type are nullified as shown in path (5). Accordingly, even when the setting of access type of cache memory 83 is changed to, for example, "don't care" ("INSTRUCTION" and "DATA" are mixed) so that the data processor 91 performs read operation with respect to the data, the data only stored in the way C or D is effective, thereby producing no collision of data in the cache memory 83 as shown in path (6). Also, even when the multicache system is used, no collision of data occurs on the data bus.

Next, the operation of cache memory shown in FIG. 13 will be detailed as follows.

When the address signal (1) is inputted, the address tag (11) is transferred to comparator (4). Set select (12) is supplied to a decoder (2b) so that an LRU bit memory (20), an address tag memory (2) and data memory (3) are decoded as specifying entry. The address tag memory (2) sends to the comparator (4) the address tag of the entry specified by the decoder (2b). The comparator (4) compares the address tag with the address tag (11) inputted from the exterior. Simultaneously, the data memory (3) also sends to word selector (5) the data (four words) of the entry specified by the decoder (2b). The word selector (5) sends one word of the data of four words to way selector (6) in accordance with word select (13) inputted from the exterior.

A signal representing the comparison result of the comparator (4) is logically added with the valid bit by the logical circuit (10) so as to decide whether or not the address tag (data stored in the cache memory) is effective. An output of each logical circuit (10) is supplied to the hit decision unit (23). The access type specified by the access type signal (AT) is compared at the hit decision unit (23) with an access type signal (AT) delivered from the access type setting unit (22), resulting in a way select signal (WS) and a hit signal (HT) being outputted from the hit decision unit (23).

When the access types agree with each other and address tags agree, one of the way select signals (WS) is active (hit way is shown) and the hit signal (HT) also is active. A way selector (6) outputs to the data processor 91 the way data specified by the way select signal (WS). Simultaneously, the way select (WS) and hit signal (HT) also are sent to the LRU control circuit (21), from where it is sent to the LRU bit memory (20) as the LRU information as to which way is hit, and the LRU bit memory (20) stores the information in the entry specified by the decoder (2b).

When the access types agree with each other and the address tags are not in agreement, the way select signals (WS) are not all active, and the hit signal (HT) also is non-active. Since the hit signal (HT) is not active, the way selector (6) outputs no data. Data (four words) of the block including the corresponding data are read-in from the exterior.

The LRU control circuit (21) responds to the nonactive hit signal (HT) to recognize the cache miss, reads out from the LRU bit memory (20) the data of entry specified by the decoder (2b), and informs the selector (2a), valid bit control circuit (14) and way selector (6), of which way is replaced. The selector (2a) stores address tag (11) at the entry specified by the decoder (2b) in the address memory (2) of the way specified by the LRU control circuit (21), the valid bit control circuit (14) also making the valid bit of the corresponding entry at the corresponding way "1". The way selector (6) writes data (four words) read from the exterior into the corresponding entry of the data memory (3) at the corresponding way. The LRU control circuit (21), after the information of way to be replaced is outputted, rewrites the LRU bit memory (20) so that the replaced way becomes the most recent.

When the access type held in the access type setting unit (22) does not agree with that specified by the access type signal (AT), the disagreement is transmitted as the purge signal (PG) from the hit decision unit (23) to the valid bit control circuit (14). The way select signal (WS) outputs the information of the way where the address tags agree but the access types do not, and the hit signal (HT) becomes non-active. The valid bit control circuit (14) zeros the valid bit of the entry specified by the decoder (2b) in the address tag memory (2), the way selector (6) outputting no data because the hit signal (HT) is nonactive. The data (four words) of a block including the corresponding data is read in from the exterior. Since the hit signal (HT) transmits the cache miss to the LRU control circuit (21), the operation as described in the aforesaid is carried out.

In this operation, the same as in the reading operation, the address tag (11) is compared at the comparator (4) and the logical sum of the result of the comparison and the valid bit is transferred to the hit decision unit (23).

When the access types agree with each other as do the address tags, one of the way select signals (WS) becomes active and the hit signal (HT) becomes active. The way selector (6) stores data from the data processor 91 into the words specified by the word selector (5) at the way specified by the decoder (2b) in the data memory (3) at the way specified by the way select signal (WS). Simultaneously, the way select signal (WS) and hit signal (HT) are sent to the LRU control circuit (21). The LRU control circuit (21) sends the LRU information as to which way is hit to the LRU bit memory (13–4), so that the LRU bit memory (20) stores the information in the corresponding entry.

When the access types agree with each other, but the address tags do not, all the way select signals (WS) are not active, and the hit signal (HT) is non-active. The way selector (6) inputs no data because of a cache miss in the address monitor, and the LRU control circuit (21) inputs no data so as not to rewrite the LRU bit memory (20).

When the writing operation causes a cache hit in the address monitor, data is written in regardless of access type. Accordingly, the LRU control circuit (21) operates the same as for cache hit even when the access type does not agree.

In this disclosure, there is shown and described only the preferred embodiment of this invention, but, as aforementioned, it is to be understood that the invention is capable of use in various other combinations and environments and is capable of changes or modifications within the scope of the inventive concept as expressed herein.

We claim:

1. A unified cache memory apparatus provided with plural sets of tag memories storing at least a part of address data and plural sets of data memories storing information at addressed memory locations, said cache memory apparatus comprising:

means for providing logic signal levels corresponding to a plurality of attributes of the information stored in said plural sets of data memories, said plurality of attributes indicating if information stored at a particular addressed memory location is an instruction or data;

means for storing the logic signal levels;

means for recognizing logic signal levels of an access property outputted from a data processor when a data processor accesses the cache memory; and means for accessing said plural sets of tag memories and said plural sets of data memories by comparing the logic signal levels in the means for storing with the logic signal levels of the access property outputted from said data processor.

2. The cache memory apparatus as set forth in claim 1, wherein said cache memory apparatus is incorporated in an n-way set associative system, where n is an integer greater than or equal to unity.

3. The cache memory apparatus as set forth in claim 2, wherein a number of said plurality of attributes of the information stored in said plural sets of data memories is equal to the number of sets of tag memories and the data memories to be managed in each entry.

4. The cache memory apparatus as set forth in claim 1, wherein said means for storing logic signal levels includes a register.

5. The cache memory apparatus as set forth in claim 1, wherein said means for storing logic signal levels is responsive to a fixed value supplied by an external signal.

6. The multiple data processing system as set forth in claim 5, wherein the means for storing the logic signal levels includes a register in said cache memory apparatus.

7. The multiple data processing system as set forth in claim 5, wherein said cache memory apparatus comprises an n-way, set associated system where n is an integer greater than or equal to unity, and said plural sets of tag memories and plural sets of data memories correspond to respective n-ways.

8. A method of operating a unified cache memory apparatus provided with plural sets of tag memories storing at least a part of address data and plural sets of data memories storing information at addressed memory locations, comprising the steps of:

providing logic signal levels corresponding to a plurality of attributes of the information stored in said plural sets of data memories, said plurality of attributes indicating if information stored at a particular addressed memory location is an instruction or data;

storing the logic signal levels;

recognizing logic signal levels of an access property outputted from a data processor when a data processor accesses the cache memory; and accessing said plural sets of tag memories and said plural sets of data memories by comparing the stored logic signal levels in the means for storing with the logic signal levels of the access property outputted from said data processor.

9. For a cache memory apparatus having a predetermined plurality of ways including address storage means for storing an address signal and data storage means for storing a data signal in each of said predetermined plurality of ways, an operating method comprising the steps of:

setting an access type of said data signal stored in said predetermined plurality of ways, said access type signal indicating if said data signal is an instruction or data;

receiving an externally provided address signal and corresponding data signal, and access type signal for defining an access type of said externally provided address signal and corresponding data signal;

detecting coincidence of the externally provided address signal with said address signal stored in one of said address storage means;

and in response to the step of detecting coincidence, nullifying said data signal stored at an address of a way in which coincidence detected and having a set access type different from the access type of said externally provided access type signal.

10. A method of operating a cache memory apparatus having data storage means for storing a data signal at each of a predetermined plurality of ways, comprising the steps of:

holding an access type signal of said data signal to be stored in each of said plurality of ways, said access type signal indicating if said data signal is an instruction or data;

changing said access type signal held;

detecting any change in said access type signal held; and in response to the step of detecting, nullifying all the data signals stored in said data storage means.

11. A cache memory apparatus having data storage means for storing a data signal at each of a predetermined plurality of ways, comprising:

holding means for holding an access type signal of said data signal to be stored in each of said plurality of ways, said access type signal indicating if said data signal is an instruction or data;

changing means for changing said access type signal held in said holding means;

detection means for detecting the change in said access type signal held in said holding means; and nullification means, responsive to said detection means, for nullifying all the data signals stored in said data storage means.

12. A cache memory apparatus having data storage means for storing therein a data signal in each of a predetermined plurality of ways, comprising:

holding means for holding an access type signal of said data signal to be stored in each of said plurality of ways, said access type signal indicating if said data signal is an instruction or data;

instruction means for instructing a change in said access type signal held in said holding means; and nullification means, responsive to said instruction means, for nullifying all the data signals store in said data storage means.

13. A cache memory apparatus having a predetermined plurality of ways including address storage means for storing an address signal and data storage means for storing a data signal in each of said predetermined plurality of ways, comprising:

setting means for setting an access type of said data signal stored in said predetermined plurality of ways, said access type indicating if said data signal is an instruction or data;

means for receiving an externally provided address signal and corresponding data signal, and access type signal for defining an access type of said externally provided address signal and corresponding data signal;

coincidence detection means for detecting coincidence of the externally provided address signal with said address signal stored in one of said address storage means; and nullification means, responsive to said coincident detection means, for nullifying said data signal stored at an address of a way in which coincidence is detected and having a set access type different from the access type of said externally provided access type signal.

14. A method of operating a cache memory apparatus having data storage means for storing therein a data signal in each of a predetermined plurality of ways, comprising the steps of:

holding an access type signal of said data signal to be stored in each of said plurality of ways, said access type signal indicating if said data signal is an instruction or data;

instructing a change in the held said access type signal; and in response to step of instructing, nullifying all the data signals stored in said data storage means.

* * * * *

REEXAMINATION CERTIFICATE (3806th)

United States Patent [19]
Ishida et al.

[11] B1 5,553,262
[45] Certificate Issued Jul. 6, 1999

[54] MEMORY APPARATUS AND METHOD CAPABLE OF SETTING ATTRIBUTE OF INFORMATION TO BE CACHED

[75] Inventors: Itsuko Ishida; Masayuki Hata; Tatsuo Yamada, all of Hyogo-ken, Japan

[73] Assignee: Mitsubishi Denki Kabushiki Kaisha, Itami, Japan

Reexamination Request:
No. 90/005,086, Aug. 26, 1998

Reexamination Certificate for:
Patent No.: 5,553,262
Issued: Sep. 3, 1996
Appl. No.: 08/231,963
Filed: Apr. 22, 1994

Related U.S. Application Data

[63] Continuation of application No. 07/730,147, Jul. 15, 1991, abandoned, which is a continuation-in-part of application No. 07/535,240, Jun. 7, 1990, abandoned, which is a continuation of application No. 07/297,289, Jan. 17, 1989, abandoned.

[51] Int. Cl.$^6$ ............... G06F 12/12; G06F 12/08
[52] U.S. Cl. ............ 711/123; 711/128; 711/135; 711/145
[58] Field of Search .................. 711/123, 128, 711/135, 145

[56] References Cited

U.S. PATENT DOCUMENTS

| | | | |
|---|---|---|---|
| 4,136,386 | 1/1979 | Annunziata et al. | 711/119 |
| 4,228,503 | 10/1980 | Waite et al. | 711/121 |
| 4,264,953 | 4/1981 | Douglas et al. | 711/3 |
| 5,097,414 | 3/1992 | Tone | 711/117 |

FOREIGN PATENT DOCUMENTS

| | | |
|---|---|---|
| 114944A2 | 8/1984 | European Pat. Off. . |
| 125855A2 | 11/1984 | European Pat. Off. . |
| 61-199137 | 9/1986 | Japan . |
| 1555300 | 11/1979 | United Kingdom . |
| 2045483 | 10/1980 | United Kingdom . |
| 2193356 | 2/1988 | United Kingdom . |

*Primary Examiner*—Reginald G. Bragdon

[57] ABSTRACT

A cache memory apparatus allocates memory regions on the basis of information attributes. The required memory region corresponding to the attribute is accessed before caching is implemented. This enables considerable reduction in apparatus that would otherwise be required to be duplicated among different chips corresponding to the number of information attributes. In a multiple data processing implementation, cache memory regions are allocated for each data processor. The required memory regions of the cache memory are accessed in accordance with information specifying the data processor before caching is carried out. To avoid data collision when the main memory data is substantially rewritten, and when data having the same address and different access types exist simultaneously, data representing the type of access is stored. In response to a change in access, all data signals stored in each ways is nullified so that a plurality of data stored in the memory regions is not simultaneously output.

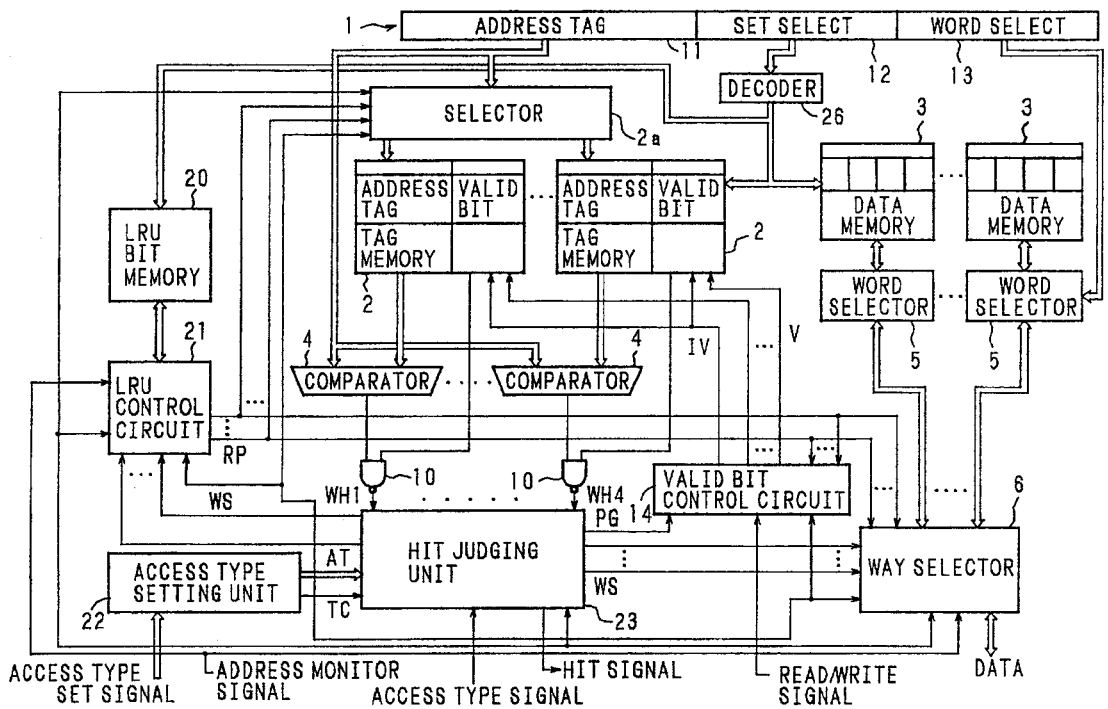

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 is confirmed.

* * * * *